US012745000B2

(12) United States Patent
Gaizman et al.

(10) Patent No.: US 12,745,000 B2
(45) Date of Patent: Sep. 22, 2026

(54) DYNAMIC SELECTION OF OPTICAL-IMAGE STABILIZATION MODES

(71) Applicant: QUALCOMM Incorporated, San Diego, CA (US)

(72) Inventors: Ron Gaizman, Hof HaCarmel (IL); Eliad Tsairi, Hof HaCarmel (IL)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 18/620,809

(22) Filed: Mar. 28, 2024

(65) Prior Publication Data

US 2025/0310644 A1 Oct. 2, 2025

(51) Int. Cl.

*H04N 23/68* (2023.01)
*H04N 23/60* (2023.01)
*H04N 23/667* (2023.01)
*H04N 23/73* (2023.01)

(52) U.S. Cl.

CPC ......... *H04N 23/6811* (2023.01); *H04N 23/64* (2023.01); *H04N 23/667* (2023.01); *H04N 23/73* (2023.01)

(58) Field of Classification Search

None

See application file for complete search history.

(56) References Cited

U.S. PATENT DOCUMENTS 9,253,400 B2 * 2/2016 Miyahara ........... H04N 23/6842
11,190,689 B1 * 11/2021 Wang ................... H04N 23/683
12,052,497 B2 * 7/2024 Gaizman ............. H04N 23/689
2006/0087562 A1 * 4/2006 Nakanishi .............. H04N 23/68 348/E5.046
2006/0216009 A1 * 9/2006 Kawamura ............ G03B 17/20 348/E5.046
2009/0052880 A1 * 2/2009 Yamamoto ............. H04N 23/68 348/208.5
2009/0316010 A1 * 12/2009 Nomura ................. H04N 23/68 348/208.6
2013/0155262 A1 * 6/2013 Katoh .................. H04N 23/683 348/208.5
2014/0139694 A1 * 5/2014 Grandin ................. H04N 23/68 348/208.12
2020/0267320 A1 * 8/2020 Song ..................... H04N 23/683
2020/0412954 A1 * 12/2020 Gaizman ........... H04N 23/6812
2023/0209202 A1 * 6/2023 Yun ........................ H04N 23/73 348/208.11

* cited by examiner

*Primary Examiner* — Cynthia Calderon
(74) *Attorney, Agent, or Firm* — Polsinelli LLP/QUALCOMM Incorporated

(57) ABSTRACT

Systems and techniques are described herein for capturing image data. For instance, a method for capturing image data is provided. The method may include obtaining image-capture information, wherein the image-capture information relates to at least one of image-capture settings of the apparatus, image-processing settings of the apparatus, or image-capture conditions; determining an optical image stabilization (OIS) mode based on the image-capture information; and enabling the determined OIS mode for capturing an image.

20 Claims, 16 Drawing Sheets

IMU 1020

1022

Activity Determiner 1026

1028

Image-Based Data 1024

OIS-Mode Selector 1002

1018

1004

Motion / Focus Controller 1006

1010

1008

Mover 1012

Lens 1014

Image Sensor 1016

1030

Image Warper 1032

1034

Image Data 1036

Image Analyzer 1040

DYNAMIC SELECTION OF OPTICAL-IMAGE STABILIZATION MODES

TECHNICAL FIELD

The present disclosure generally relates to capturing images. For example, aspects of the present disclosure include systems and techniques for capturing images using optical image stabilization.

BACKGROUND

A camera can receive light and capture image frames, such as still images or video frames, using an image sensor. Cameras can be configured with a variety of image-capture settings and/or image-processing settings to alter the appearance of images captured thereby. Image-capture settings may be determined and applied before and/or while an image is captured, such as ISO, exposure time (also referred to as exposure, exposure duration, or shutter speed), aperture size, (also referred to as f/stop), focus, and gain (including analog and/or digital gain), among others. Image-processing settings can be configured for post-processing of an image, such as alterations to contrast, brightness, saturation, sharpness, levels, curves, and colors, among others.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for capturing image data. According to at least one example, a method is provided for capturing image data. The method includes: obtaining image-capture information, wherein the image-capture information relates to at least one of image-capture settings of a device, image-processing settings of the device, or image-capture conditions; determining an optical image stabilization (OIS) mode based on the image-capture information; and enabling the determined OIS mode for capturing an image.

In another example, an apparatus for capturing image data is provided that includes at least one memory and at least one processor (e.g., configured in circuitry) coupled to the at least one memory. The at least one processor configured to: obtain image-capture information, wherein the image-capture information relates to at least one of image-capture settings of the apparatus, image-processing settings of the apparatus, or image-capture conditions; determine an optical image stabilization (OIS) mode based on the image-capture information; and enable the determined OIS mode for capturing an image.

In another example, a non-transitory computer-readable medium of a device is provided that has stored thereon instructions that, when executed by one or more processors, cause the one or more processors to: obtain image-capture information, wherein the image-capture information relates to at least one of image-capture settings of the device, image-processing settings of the device, or image-capture conditions; determine an optical image stabilization (OIS) mode based on the image-capture information; and enable the determined OIS mode for capturing an image.

In another example, an apparatus for capturing image data is provided. The apparatus includes: means for obtaining image-capture information, wherein the image-capture information relates to at least one of image-capture settings of the apparatus, image-processing settings of the apparatus, or image-capture conditions; means for determining an optical image stabilization (OIS) mode based on the image-capture information; and means for enabling the determined OIS mode for capturing an image.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors, including, for example, inertial measurement units (IMUs), gyroscopic sensors, accelerometers, and/or magnetic sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
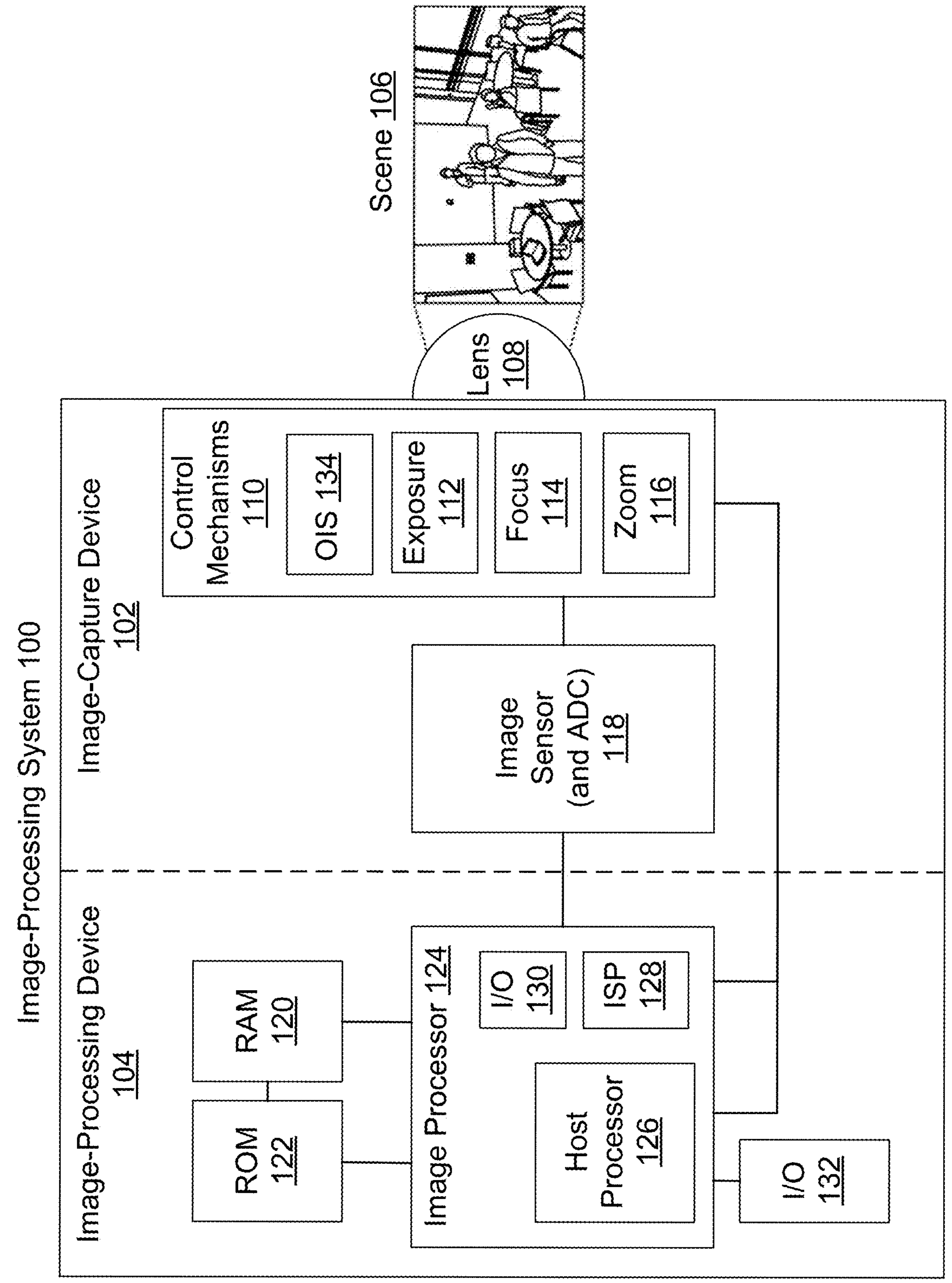
FIG. 1 is a block diagram illustrating an example architecture of an image processing system, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Electronic devices (e.g., mobile phones, wearable devices (e.g., smart watches, smart glasses, etc.), tablet computers, extended reality (XR) devices (e.g., virtual reality (VR) devices, augmented reality (AR) devices, mixed reality (MR) devices, and the like), connected devices, laptop computers, etc.) are increasingly equipped with cameras to capture image frames, such as still images and/or video frames, for consumption. For example, an electronic device can include a camera to allow the electronic device to capture a video or image of a scene, a person, an object, etc. Additionally, cameras themselves are used in a number of configurations (e.g., handheld digital cameras, digital single-lens-reflex (DSLR) cameras, worn camera (including body-mounted cameras and head-borne cameras), stationary cameras (e.g., for security and/or monitoring), vehicle-mounted cameras, etc.).

A camera can receive light and capture image frames (e.g., still images or video frames) using an image sensor (which may include an array of photosensors). In some examples, a camera may include one or more processors, such as image signal processors (ISPs), that can process one or more image frames captured by an image sensor. For example, a raw image frame captured by an image sensor can be processed by an image signal processor (ISP) of a camera to generate a final image. In some cases, a camera, or an electronic device implementing a camera, can further process a captured image or video for certain effects (e.g., compression, image enhancement, image restoration, scaling, framerate conversion, etc.) and/or certain applications such as computer vision, extended reality (e.g., augmented reality, virtual reality, and the like), object detection, image recognition (e.g., face recognition, object recognition, scene recognition, etc.), feature extraction, authentication, and automation, among others.

Cameras can be configured with a variety of image-capture settings and/or image-processing settings to alter the appearance of an image. Image-capture settings can be determined and applied before or while an image is captured, such as ISO, exposure time (also referred to as exposure, exposure duration, and/or shutter speed), aperture size (also referred to as f/stop), focus, and gain, among others. Image-processing settings can be configured for post-processing of an image, such as alterations to a contrast, brightness, saturation, sharpness, levels, curves, and colors, among others.

The term "exposure," relating to an image captured by a camera, refers to the amount of light per unit area that reaches a photographic film, or in modern cameras, an electronic image sensor (e.g., including an array of photodiodes). The exposure is based on certain image-capture settings such as, for example, exposure time, and/or lens aperture, as well as the luminance of the scene being photographed. Because of the relationship between the amount of light that reaches an image sensor and the duration of time the image sensors is allowed to capture the light, in the present disclosure, the terms "exposure," "exposure duration," and "exposure time" may refer to a duration of time during which the electronic image sensor is exposed to light (e.g., while the electronic image sensor is capturing an image) and/or an amount of time during which light reaching an image sensor is recorded as a single image frame.

Based on the exposure duration, it takes a certain amount of time to capture an image. During that time, the camera may move. If a camera moves while the camera is capturing an image (e.g., during an exposure while light is being captured and recorded as an image), the image may be blurry. For example, a pixel of an image sensor may receive light from two or more points in a scene because the camera (including the image sensor) moved relative to the scene while the image sensor was capturing light from the scene. The pixel may record values (e.g., red, green, and blue light-intensity values) based on the two or more points in the scene. The recorded values may be based on the two or more points in the scene and may thus not represent a single point in the scene and may thus be blurry. All of the pixels of the image sensor may be similarly affected and thus the image may be blurry.

Optical image stabilization (OIS) includes a number of techniques for changing how light arrives at an image sensor of an image-capture device to compensate for movements of the imaging device. For example, a user may hold an image-capture device (e.g., a camera or a smartphone including a camera) in a hand of the user. The hand of the user may move (e.g., the hand of the user may shake without the user intending to move their hand). According to an OIS technique, the image-capture device may move the lens and/or the sensor of the image-capture device to compensate for the movement of the hand of the user. For instance, an image sensor may be moved to compensate for motion of an image-capture device. Additionally or alternatively, a lens that focuses light onto the image sensor may be moved to compensate for motion of the image-capture device. Some OIS techniques may use a gimbal to move the image sensor and/or the lens. Some OIS techniques may tilt or rotate the image sensor and/or the lens. Additionally or alternatively, some OIS techniques may use a prism to adjust the path of light between the lens and the image sensor to compensate for motion of the image-capture device.

In the present disclosure, components of an image-capture device that are used to capture light and translate the light into measurements may be referred to collectively as image-capture components. Image-capture components include a lens, an image sensor, and/or a prism or other light altering medium between the lens and the image sensor. In general, an OIS technique may involve moving image-capture components to compensate for motion of an image-capture device. Compensating for the motion of the image-capture device may be, or may include, moving the image-capture components in a way that is opposite the motion of the image-capture device such that the image-capture components remain substantially stable despite the motion of the image-capture device.

OIS techniques may move image-capture components while a single frame is being captured (e.g., during the exposure time of the single frame). Compensating for motion while a single frame is being captured may decrease blur in the single frame, for example, by causing the image-capture components to remain substantially stationary despite motion of the image-capture device.

Additionally, OIS techniques be used while video data is being captured. Compensating for motion while each frame of video data is being captured may decrease blur in each frame. Further, compensating for motion continuously, while each frame is being captured and between when frames are being captured, may stabilize the video data.

For example, if a hand holding an image-capture device is shaking, and a single frame is being captured, and OIS technique may compensate for the shaking while the single frame is being captured (e.g., during the exposure time of the single frame) such that the single frame is sharp (e.g., does not exhibit blur based on the shaking of the image-capture device).

Further, the OIS technique may compensate for the shaking during and between multiple exposure times of multiple frames of video data. In this case, the OIS technique may stabilize the video data such that all of the frames of the video data appear to have been captured from a stable device, for example, based on the image-capture components remaining substantially stable across the multiple frames.

There are different modes for moving image-capture components to compensate for motion of an image-capture device. The different modes may have different advantages and disadvantages and the different modes may be best for different image-capture scenarios.

As an example, a full-range (normal) OIS mode may involve moving the image-capture components in time with the movement of the image-capture device to directly compensate for the motion of the image-capture device. According to the full-range (normal) OIS mode, the image-capture components may be moved to fully compensate for motion of the image-capture device within the motion range of a mover of the image-capture components. However, beyond the motion range, the full-range (normal) OIS mode may be unable to move the image-capture components to compensate for motion of the image-capture device. A (normal) full-range OIS mode may be capable of stabilizing video data within the motion range of the mover. A normal full-range OIS mode may move continuously to counteract device movement, for example, a normal full-range OIS mode may not regard time between exposures differently than time during exposures.

As another example, a recentering OIS mode may involve moving the image-capture components to compensate for motion of the image-capture device while the image sensor is capturing a frame (e.g., during an exposure) and recentering the image-capture components during a recentering time (e.g., between exposures). Recentering the image-capture components may allow the recentering OIS mode to have the full motion range of a mover of the image-capture components available for capturing each frame. In effect, recentering OIS mode may extend the motion range of the mover. Thus, at each frame recentering OIS mode could fully counteract the device movement during exposure time which would yield full compensation of the motion blur. An image captured according to recentering OIS mode may be sharp. However, because each frame is captured based on an effectively centered image sensor, each frame will reflect the angle at which the camera was pointed when the image was captured. Thus, recentering OIS mode may not effectively provide stabilization to video data.

Partially-recentering OIS mode may be a hybrid between full-range (normal) OIS mode and recentering OIS mode. According to partially-recentering OIS mode, between exposures, the image-capture components may be moved toward the center, but not fully recentered. Partially-recentering OIS mode may have a greater motion range than a full-range OIS mode but not as great a range as recentering OIS mode. Also, partially-recentering OIS mode may be more capable of stabilizing video data than recentering OIS mode, but less capable of stabilizing video data than full-range OIS mode. While doing stabilizing images of vide data, the partially-recentering OIS mode may counteract the motion blur until OIS gets to the limit (e.g., the motion range). The motion range may be reached during long movement in the same direction (e.g., during a pan).

As yet another example, a centered OIS mode may involve maintaining the image-capture components in a centered position (e.g., not moving the image-capture components to compensate for motion of the image-capture device). If a camera is capturing video data, and the camera is panning, a centered OIS mode may result in the best video data. For example, the centered OIS mode may avoid a judder effect.

Systems, apparatuses, methods (also referred to as processes), and computer-readable media (collectively referred to herein as "systems and techniques") are described herein for selecting OIS modes. For example, the systems and techniques described herein may obtain image-capture information and determine an OIS mode based on the image-capture information. For example, the systems and techniques may obtain an indication of an exposure duration and motion data indicative of motion of an image-capture device as one or more images are being captured. In some cases, the motion of the image-capture device can be due to movement of a hand of a user of the image-capture device (e.g., when the image-capture device is a hand-held device, such as a mobile phone, a tablet computer, a wearable device, etc.), due to movement of a head of the user of the image-capture device (e.g., when the image-capture device is a head-worn device, such as an XR device). In some cases, the motion of the image-capture device can be due to movement of a system (e.g., a vehicle, robotic system, etc.) including the image-capture device. The systems and techniques may determine, based on the exposure duration and the motion data, an OIS mode to use to capture images.

By selecting (e.g., dynamically) the OIS mode, the systems and techniques may allow an image-capture device to capture images (e.g., frames of video data) in an OIS mode that is most appropriate to the image being captured. For example, the systems and techniques may enable a full-range OIS mode to stabilize (normal) video data when a motion range of a mover of image-capture components of the image-capture device is sufficient to compensate for current motion of the image-capture device. Further, if the image-capture device begins to pan, the systems and techniques may switch to a centered OIS mode while the image-capture is panning. Further still, if the panning ceases, and a user of the image-capture device is shaking the image-capture device (e.g., based on movement of a hand of the user, a head of the user, etc.) and/or a system (e.g., a vehicle, robotic system, etc.) is shaking the image-capture device beyond a threshold, the systems and techniques may switch to a recentering OIS mode. The frames of video data captured according to the various OIS modes may be better than the frames would be if all of the frames were captured according to any one of the OIS modes.

The systems and techniques may achieve a better stabilization-motion blur tradeoff solution (e.g., the systems and techniques may dynamically determine an OIS mode that is appropriate for video being captured) than existing techniques. For example, in cases in which stabilization is appropriate and/or exposure time is low, the systems and techniques may determine to use full-range OIS mode. In cases in which exposure time is high, cases in which stabilization requirements are not high (e.g., when an image-capture device is being held in a hand of a user and/or worn on a head of the user) and/or cases of indoor use, the systems and techniques may determine to use recentering OIS mode (e.g., to reduce motion blur).

For cases in which exposure time is medium or higher and there is a need to for stabilization quality the systems and techniques may determine to use partially-recentering OIS mode. Additionally or alternatively, the systems and techniques may determine a partial-speed ratio (e.g., a speed at which image-capture components move towards the center) according to desired trade-off between global stabilization and motion-blur reduction needs.

Various aspects of the application will be described with respect to the figures below.

FIG. 1 is a block diagram illustrating an example architecture of an image-processing system 100, according to various aspects of the present disclosure. The image-processing system 100 includes various components that are used to capture and process images, such as an image of a scene 106. The image-processing system 100 can capture image frames (e.g., still images or video frames). In some cases, the lens 108 and image sensor 118 (which may include an analog-to-digital converter (ADC)) can be associated with an optical axis. In one illustrative example, the photosensitive area of the image sensor 118 (e.g., the photodiodes) and the lens 108 can both be centered on the optical axis.

In some examples, the lens 108 of the image-processing system 100 faces a scene 106 and receives light from the scene 106. The lens 108 bends incoming light from the scene toward the image sensor 118. The light received by the lens 108 then passes through an aperture of the image-processing system 100. In some cases, the aperture (e.g., the aperture size) is controlled by one or more control mechanisms 110. In other cases, the aperture can have a fixed size.

The one or more control mechanisms 110 can control exposure, focus, zoom, and/or perform image stabilization (e.g., optical image stabilization (OIS)) based on information from the image sensor 118 and/or information from the image processor 124. In some cases, the one or more control mechanisms 110 can include multiple mechanisms and components. For example, the control mechanisms 110 can include one or more exposure-control mechanisms 112, one or more focus-control mechanisms 114, one or more zoom-control mechanisms 116 and/or one or more OIS control mechanisms 134. The one or more control mechanisms 110 may also include additional control mechanisms besides those illustrated in FIG. 1. For example, in some cases, the one or more control mechanisms 110 can include control mechanisms for controlling analog gain, flash, HDR, depth of field, and/or other image capture properties.

The focus-control mechanism 114 of the control mechanisms 110 can obtain a focus setting. In some examples, focus-control mechanism 114 stores the focus setting in a memory register. Based on the focus setting, the focus-control mechanism 114 can adjust the position of the lens 108 relative to the position of the image sensor 118. For example, based on the focus setting, the focus-control mechanism 114 can move the lens 108 closer to the image sensor 118 or farther from the image sensor 118 by actuating a motor or servo (or other lens mechanism), thereby adjusting the focus. In some cases, additional lenses may be included in the image-processing system 100. For example, the image-processing system 100 can include one or more microlenses over each photodiode of the image sensor 118. The microlenses can each bend the light received from the lens 108 toward the corresponding photodiode before the light reaches the photodiode.

In some examples, the focus setting may be determined via contrast detection autofocus (CDAF), phase detection autofocus (PDAF), hybrid autofocus (HAF), or some combination thereof. The focus setting may be determined using the control mechanism 110, the image sensor 118, and/or the image processor 124. The focus setting may be referred to as an image capture setting and/or an image processing setting. In some cases, the lens 108 can be fixed relative to the image sensor and the focus-control mechanism 114.

The exposure-control mechanism 112 of the control mechanisms 110 can obtain an exposure setting. In some cases, the exposure-control mechanism 112 stores the exposure setting in a memory register. Based on the exposure setting, the exposure-control mechanism 112 can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 118 (e.g., ISO speed or film speed), analog gain applied by the image sensor 118, or any combination thereof. The exposure setting may be referred to as an image capture setting and/or an image processing setting.

The zoom-control mechanism 116 of the control mechanisms 110 can obtain a zoom setting. In some examples, the zoom-control mechanism 116 stores the zoom setting in a memory register. Based on the zoom setting, the zoom-control mechanism 116 can control a focal length of an assembly of lens elements (lens assembly) that includes the lens 108 and one or more additional lenses. For example, the zoom-control mechanism 116 can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 108 in some cases) that receives the light from the scene 106 first, with the light then passing through a focal zoom system between the focusing lens (e.g., lens 108) and the image sensor 118 before the light reaches the image sensor 118. The focal zoom system may, in some cases, include two positive (e.g., converging, convex) lenses of equal or similar focal length (e.g., within a threshold difference of one another) with a negative (e.g., diverging, concave) lens between them. In some cases, the zoom-control mechanism 116 moves one or more of the lenses in the focal zoom system, such as the negative lens and one or both of the positive lenses. In some cases, zoom-control mechanism 116 can control the zoom by capturing an image from an image sensor of a plurality of image sensors (e.g., including image sensor 118) with a zoom corresponding to the zoom setting. For example, the image-processing system 100 can include a wide-angle image sensor with a relatively low zoom and a telephoto image sensor with a greater zoom. In some cases, based on the selected zoom setting, the zoom-control mechanism 116 can capture images from a corresponding sensor.

In some aspects, in addition to zooming using zoom-control mechanism 116 to control the focal length of lens 108, image-processing system 100 may implement a digital zoom (e.g., at image-processing device 104). Digital zoom may be, or may include, cropping and expanding image data to simulate change in focal length.

The OIS control mechanism 134 may perform optical image stabilization, for example, by moving image-capture components (e.g., lens 108 and/or image sensor 118) to compensate for motion of image-capture device 102. For example, one or more OIS control mechanisms 134 may obtain motion information of the image-capture device 102 (e.g., due to movement of a hand of a user holding the image-capture device 102, a head of the user wearing the image-capture device 102, a system including the image-capture device 102, etc.), for example, from an inertial measurement unit (IMU), and move the image-capture components to compensate for the movement of image-capture device 102.

The image sensor 118 includes one or more arrays of photodiodes or other photosensitive elements. Each photodiode measures an amount of light that eventually corresponds to a particular pixel in the image produced by the image sensor 118. In some cases, different photodiodes may be covered by different filters. In some cases, different photodiodes can be covered in color filters, and may thus measure light matching the color of the filter covering the photodiode. Various color filter arrays can be used such as, for example and without limitation, a Bayer color filter array, a quad color filter array (QCFA), and/or any other color filter array.

In some cases, the image sensor 118 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an infrared (IR) cut filter, an ultraviolet (UV) cut filter, a band-pass filter, low-pass filter, high-pass filter, or the like). The image sensor 118 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 110 may be included instead or additionally in the image sensor 118. The image sensor 118 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 15:
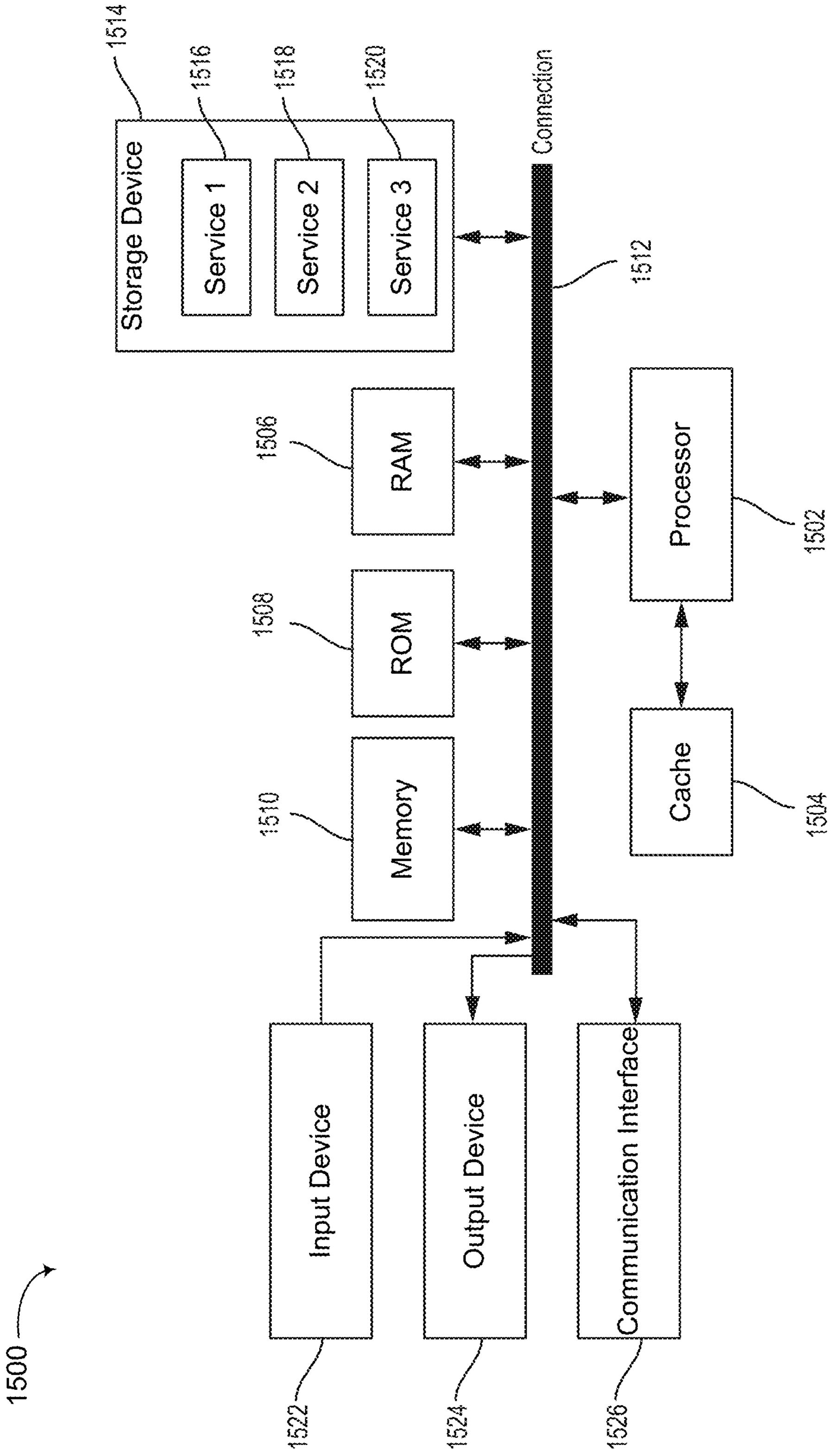
FIG. 15 is a block diagram illustrating an example computing-device architecture of an example computing device which can implement the various techniques described herein.

The image processor 124 may include one or more processors, such as one or more image signal processors (ISPs) (including ISP 128), one or more host processors (including host processor 126), and/or one or more of any other type of processor discussed with respect to the computing-device architecture 1500 of FIG. 15. The host processor 126 can be a digital signal processor (DSP) and/or other type of processor. In some implementations, the image processor 124 is a single integrated circuit or chip (e.g., referred to as a system-on-chip or SoC) that includes the host processor 126 and the ISP 128. In some cases, the chip can also include one or more input/output ports (e.g., input/output (I/O) ports 130), central processing units (CPUs), graphics processing units (GPUs), broadband modems (e.g., third generation (3G), fourth generation (4G) or long-term evolution (LTE), fifth generation (5G), etc.), memory, connectivity components (e.g., Bluetooth™, Global Positioning System (GPS), etc.), any combination thereof, and/or other components. The I/O ports 130 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General-Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 126 can communicate with the image sensor 118 using an I2C port, and the ISP 128 can communicate with the image sensor 118 using an MIPI port.

The image processor 124 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 124 may store image frames and/or processed images in random-access memory (RAM) 120, read-only memory (ROM) 122, a cache, a memory unit, another storage device, or some combination thereof.

Various input/output (I/O) devices 132 may be connected to the image processor 124. The I/O devices 132 can include a display screen, a keyboard, a keypad, a touchscreen, a trackpad, a touch-sensitive surface, a printer, any other output devices, any other input devices, or any combination thereof. In some cases, a caption may be input into the image-processing device 104 through a physical keyboard or keypad of the I/O devices 132, or through a virtual keyboard or keypad of a touchscreen of the I/O devices 132. The I/O devices 132 may include one or more ports, jacks, or other connectors that enable a wired connection between the image-processing system 100 and one or more peripheral devices, over which the image-processing system 100 may receive data from the one or more peripheral device and/or transmit data to the one or more peripheral devices. The I/O devices 132 may include one or more wireless transceivers that enable a wireless connection between the image-processing system 100 and one or more peripheral devices, over which the image-processing system 100 may receive data from the one or more peripheral device and/or transmit data to the one or more peripheral devices. The peripheral devices may include any of the previously-discussed types of the I/O devices 132 and may themselves be considered I/O devices 132 once they are coupled to the ports, jacks, wireless transceivers, or other wired and/or wireless connectors.

In some cases, the image-processing system 100 may be a single device. In some cases, the image-processing system 100 may be two or more separate devices, including an image-capture device 102 (e.g., a camera) and an image-processing device 104 (e.g., a computing device coupled to the camera). In some implementations, the image-capture device 102 and the image-capture device 102 may be coupled together, for example via one or more wires, cables, or other electrical connectors, and/or wirelessly via one or more wireless transceivers. In some implementations, the image-capture device 102 and the image-processing device 104 may be disconnected from one another.

As shown in FIG. 1, a vertical dashed line divides the image-processing system 100 of FIG. 1 into two portions that represent the image-capture device 102 and the image-processing device 104, respectively. The image-capture device 102 includes the lens 108, control mechanisms 110, and the image sensor 118. The image-processing device 104 includes the image processor 124 (including the ISP 128 and the host processor 126), the RAM 120, the ROM 122, and the I/O device 132. In some cases, certain components illustrated in the image-capture device 102, such as the ISP 128 and/or the host processor 126, may be included in the image-capture device 102. In some examples, the image-processing system 100 can include one or more wireless transceivers for wireless communications, such as cellular network communications, 802.11 wi-fi communications, wireless local area network (WLAN) communications, or some combination thereof.

The image-processing system 100 can be part of, or implemented by, a single computing device or multiple computing devices. In some examples, the image-processing system 100 can be part of an electronic device (or devices) such as an XR device (e.g., a VR, AR, and/or MR head-mounted device (HMD), smart glasses, etc.), a mobile device (e.g., a mobile phone), a tablet computer, a camera system (e.g., a digital camera, an internet protocol (IP) camera, a video camera, a security camera, etc.), a telephone system (e.g., a smartphone, a cellular telephone, a conferencing system, etc.), a laptop or notebook computer, a set-top box, a smart television, a display device, a game console, an IoT (Internet-of-Things) device, a smart wearable device, a video streaming device, an Internet Protocol (IP) camera, or any other suitable electronic device(s).

While the image-processing system 100 is shown to include certain components, one of ordinary skill will appreciate that the image-processing system 100 can include more components than those shown in FIG. 1. The components of the image-processing system 100 can include software, hardware, or one or more combinations of software and hardware. For example, in some implementations, the components of the image-processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image-processing system 100.

In some examples, the computing-device architecture 1500 shown in FIG. 15 and further described below can include the image-processing system 100, the image-capture device 102, the image-processing device 104, or a combination thereof.

Figure 2:
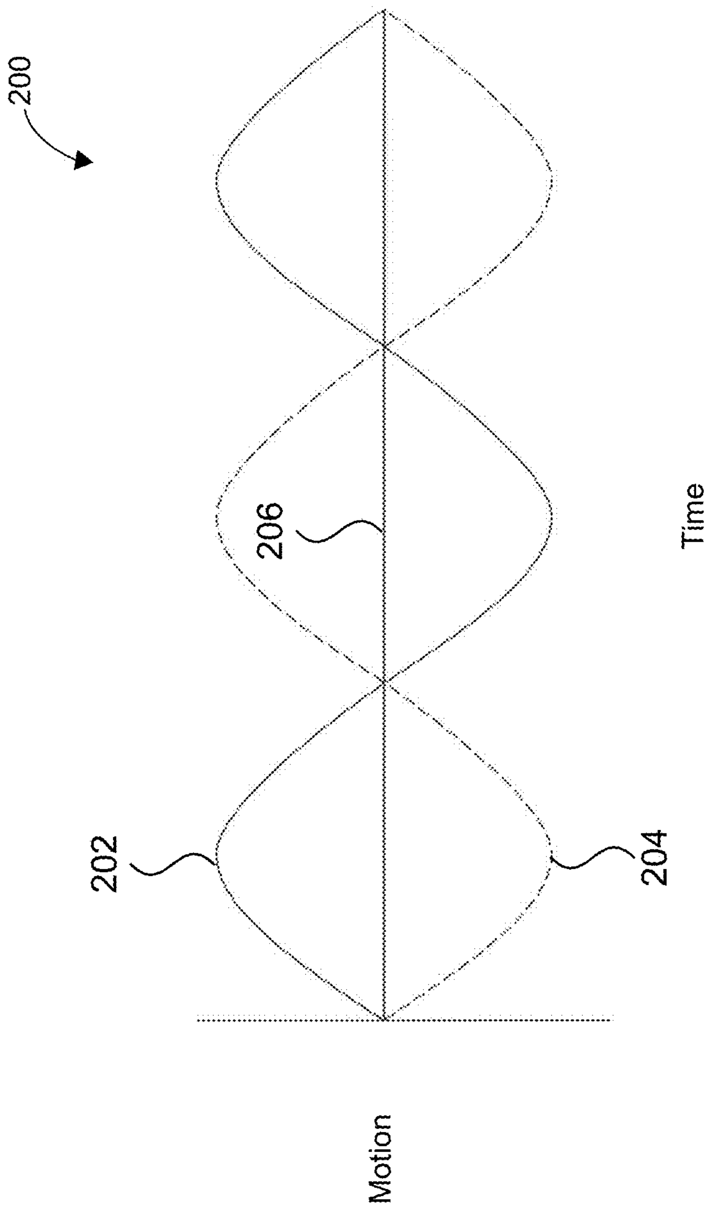
FIG. 2 includes a graph representing motion (e.g., device motion), OIS motion, and a sum of the motion and the OIS motion, according to various aspects of the present disclosure.

FIG. 2 includes a graph 200 representing motion 202 of an image-capture device, OIS motion 204, and a sum 206 of motion 202 and OIS motion 204, according to various aspects of the present disclosure. In one illustrative example, a hand holding an image-capture device (e.g., image-capture device 102 of FIG. 1) may move and cause motion 202. Alternatively, the image-capture device may be head-mounted or mounted on a system (e.g., a vehicle, robotic system, etc.) and motion of head or system may cause motion 202. Motion 202 may represent motion according to three perpendicular degrees of freedom (DoF) (e.g., an x-axis, a y-axis, and a z-axis). Additionally or alternatively, motion 202 may represent rotation according to three perpendicular degrees of freedom (e.g., roll, pitch, and yaw). All six degrees of freedom are represented along a single motion dimension in graph 200 for simplicity.

According to an optical image stabilization (OIS) technique a mover (e.g., a component of control mechanism 110 of FIG. 1) may move image-capture components (e.g., lens 108 of FIG. 1 and/or image sensor 118 of FIG. 1) of the image-capture device to compensate for motion 202. The motion of the image-capture components is represented by OIS motion 204. OIS motion 204 may be opposite motion 202 (e.g., according to six degrees of freedom of motion 202). Thus, though the image-capture device may move, the image-capture components within the image capture device may be held substantially immobile according to the OIS technique. To illustrate this, sum 206 represents a sum between motion 202 and OIS motion 204.

Graph 200 is an example of operations of a full-range OIS mode where motion 202 does not exceed the motion range of the mover of the image-capture components. For example, the mover may have a motion range of 1 degree. A 1-degree motion range may mean that the mover is capable of tilting the image-capture components (e.g., in an azimuth and/or elevation) (and/or rolling the image-capture components) up to 1 degree from center. A tilt of the image-capture components (e.g., according to an azimuth and elevation) (and/or a roll of the image-capture components) may compensate for rotation and/or translation of the image-capture device according to six degrees of freedom. Motion 202 may be within 1 degree and OIS motion 204 may completely compensate for motion 202.

Figure 3:
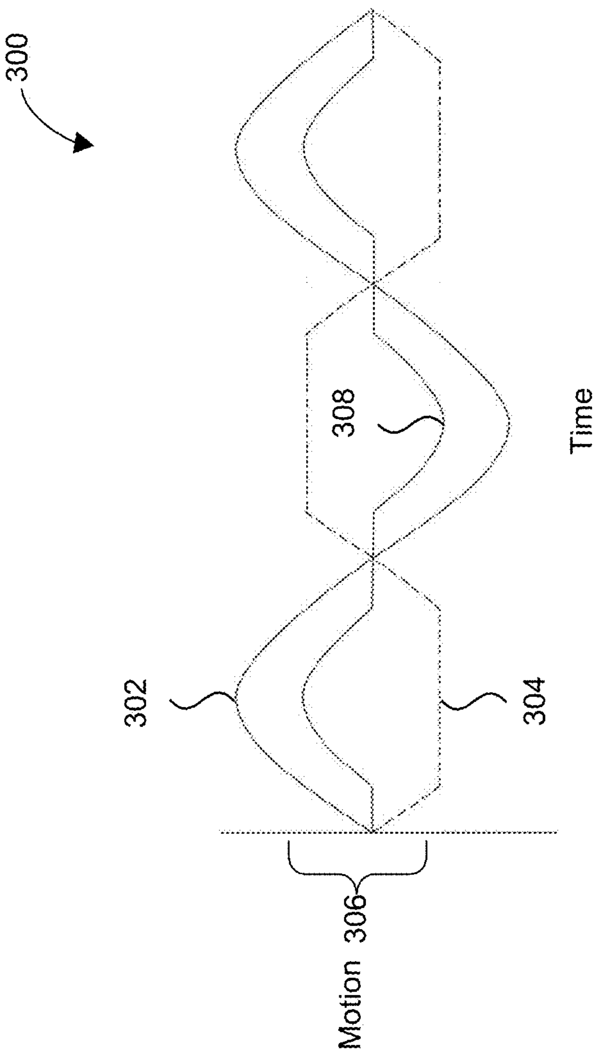
FIG. 3 includes a graph representing motion (e.g., device motion), OIS motion, and a sum of the motion and the OIS motion, according to various aspects of the present disclosure.

FIG. 3 includes a graph 300 representing motion 302, OIS motion 304, and a sum 308 of motion 302 and OIS motion 304, according to various aspects of the present disclosure. Graph 300 is an example of operations of a full-range OIS mode where motion 302 exceeds the motion range of the mover of the image-capture components. For example, the mover of the image-capture components may have an OIS range 306, meaning the mover can move the image-capture components to compensate for motion within OIS range 306 (e.g., 1 degree). Motion 302 may exceed OIS range 306. For example, motion 302 may have an extent of 2 degrees. In such a case, the mover may move the image-capture components according to OIS motion 304 to compensate for motion 302. OIS motion 304 may compensate for a portion of motion 302 (e.g., the portion that is less than OIS range 306). However, OIS motion 304 does not compensate for the portion of motion 302 that exceeds OIS range 306. Thus, sum 308 is zero in some portions and non-zero in other portions.

Figure 4:
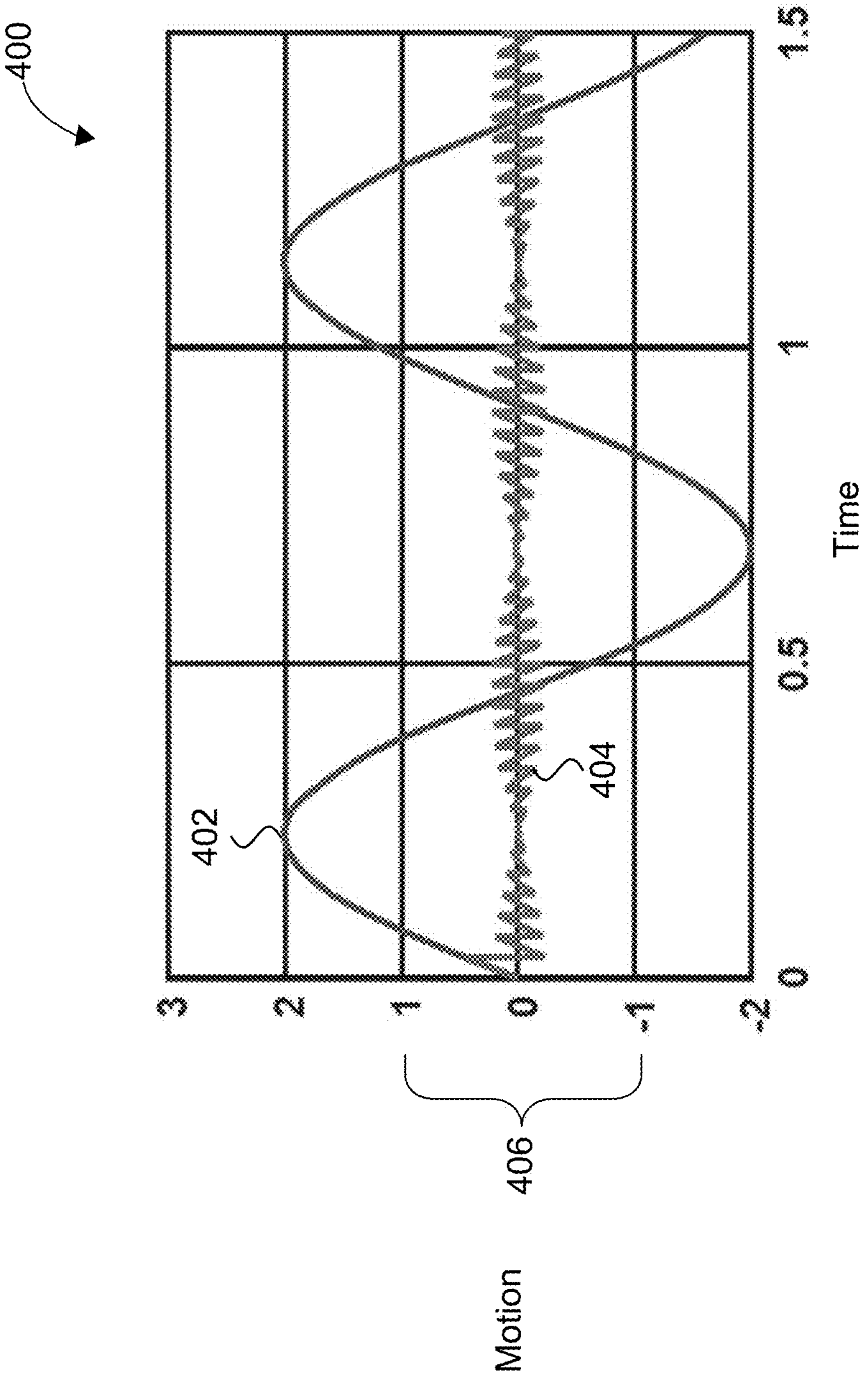
FIG. 4 includes a graph representing full-range motion and recentering OIS motion, according to various aspects of the present disclosure.

FIG. 4 includes a graph 400 representing full-range OIS motion 402 and recentering OIS motion 404, according to various aspects of the present disclosure. Graph 400 is an example of operations of a recentering OIS mode. For example, full-range OIS motion 402 illustrates motion of image-capture components that would compensate for motion of 2 degrees to −2 degrees. Most movers do not have a motion range large enough to compensate such a wide range of motion. According to a recentering OIS mode, the mover of the image-capture components may move the image-capture components to compensate for motion during exposure times and may recenter the image-capture components between exposure times (and/or readout times). Thus, piecewise segments of recentering OIS motion 404 may track the slope of full-range OIS mode 402, but the piecewise segments of recentering OIS motion 404 may be centered around 0.

Figure 5:
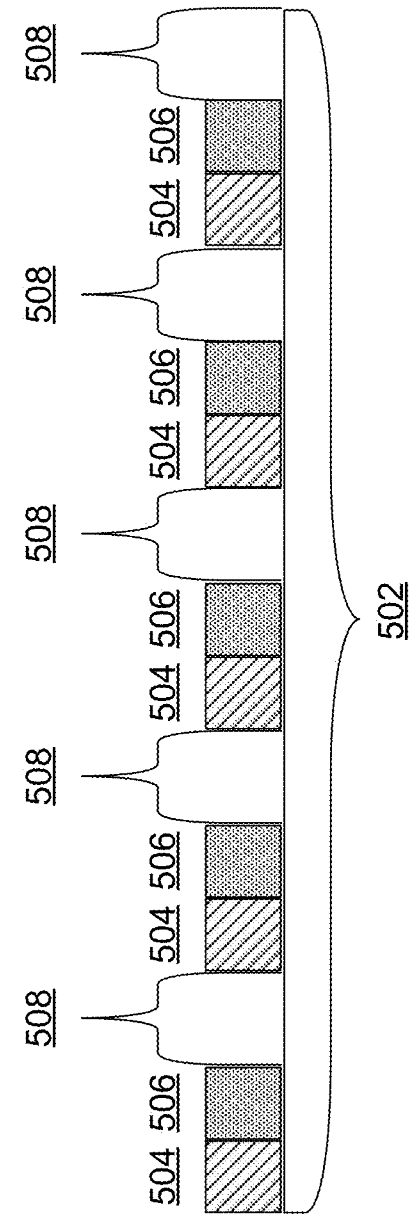
FIG. 5 includes an illustration of an example duration during which multiple image frames (e.g., of video data) may be captured, according to various aspects of the present disclosure.

For example, FIG. 5 includes an illustration of an example duration 502 during which multiple image frames (e.g., of video data) may be captured, according to various aspects of the present disclosure. For instance, example duration 502 may be $\frac{1}{6}^{th}$ of a second. An image-capture device may be capturing frames at a rate of 30 frames per second (fps). Thus, during example duration 502, the image-capture device may capture 5 frames. Capturing the five frames may include measuring light at the image sensor during exposure durations 504 (which may each be 10 milliseconds (ms) in duration) and reading measure light values from the image sensor during readout durations 506 (which may each be 10 ms in duration). At a frame-capture rate of 30 fps, and with an exposure duration of 10 ms and a readout duration of 10 ms, there may be 13.333 ms of unused time between capturing frames. The recentering OIS mode may use the time between capturing frames as a time to recenter the image-capture components. Accordingly, the times between capturing frames may be referred to as recentering durations 508.

Figure 6:
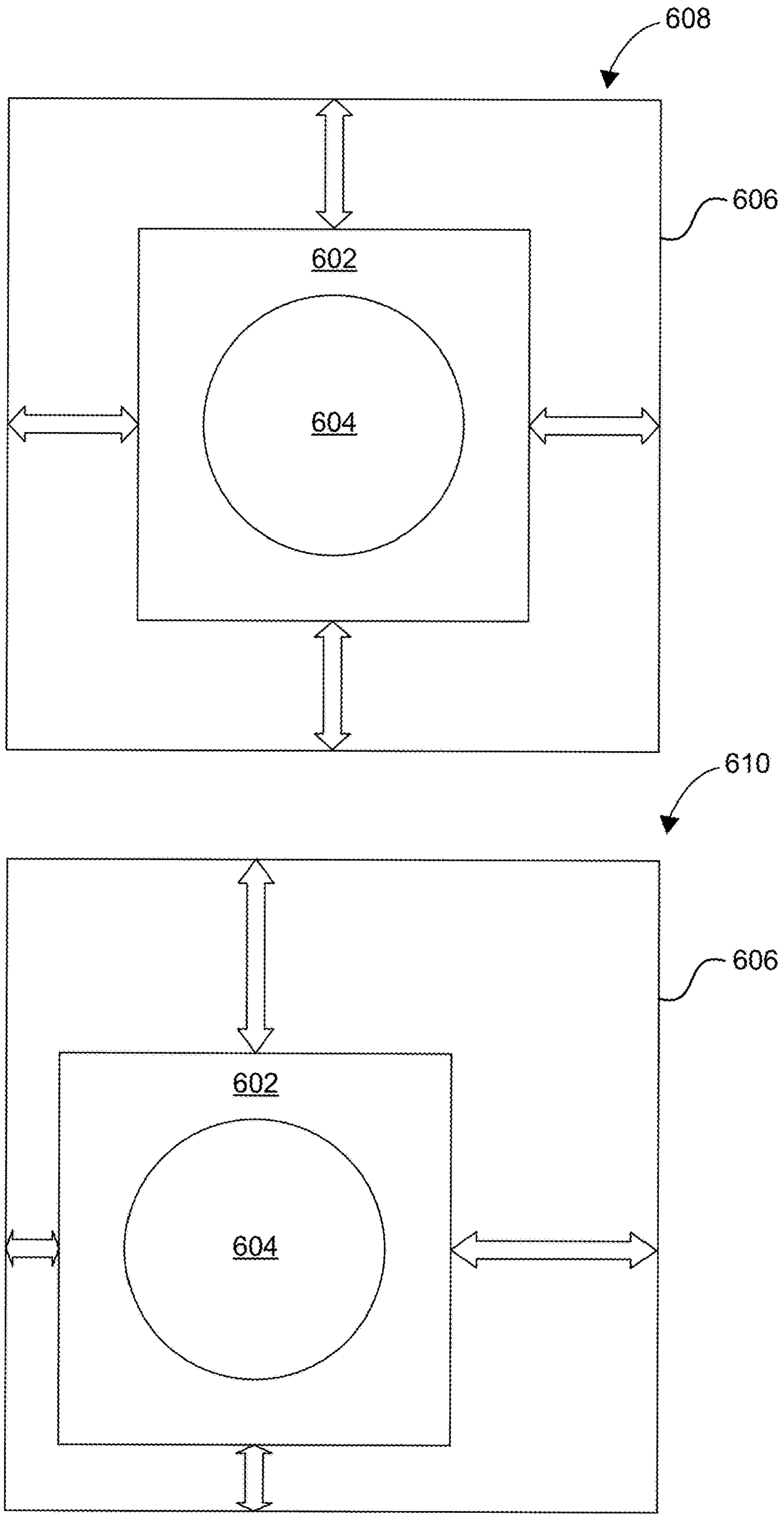
FIG. 6 illustrates an example of image-capture components to illustrate a "center," according to various aspects of the present disclosure.

FIG. 6 illustrates an example of image-capture components to illustrate a "center," according to various aspects of the present disclosure. For example, FIG. 6 illustrates a lens 604 that may focus light onto an image sensor 602. Image sensor 602 and lens 604 may be moved (and/or rotated) according to an OIS technique. For example, image sensor 602 and lens 604 may be in a position 608 or in a position 610 relative to a motion range 606. When image sensor 602 and lens 604 are in position 608, image sensor 602 and position 608 may be "centered." For example, image sensor 602 and lens 604 may be in a center of their movement range. While FIG. 6 illustrates motion range 606 and movement laterally, the same concepts apply to a rotational motion range and rotations of image sensor 602 and/or lens 604.

Returning to FIG. 4, according to the recentering OIS mode, the mover may move the image-capture components to compensate for motion of an image-capture device including the image-capture components (e.g., due to motion of a hand and/or head holding the device or due to motion of a system including the device) during exposure times. Thus, while the image-capture components are capturing light and recording the captured light as image data, recentering OIS motion 404 may compensate for (e.g., be the opposite of) the motion (e.g., having the same slope as full-range recentering OIS motion 402). Then, while the image-capture are not capturing and recording light, recentering OIS motion 404 may return to a centered position (e.g., around zero on the motion axis). The sum of the motion and OIS motion 404 (not illustrated on graph 400) during the exposure times may be zero.

Figure 7:
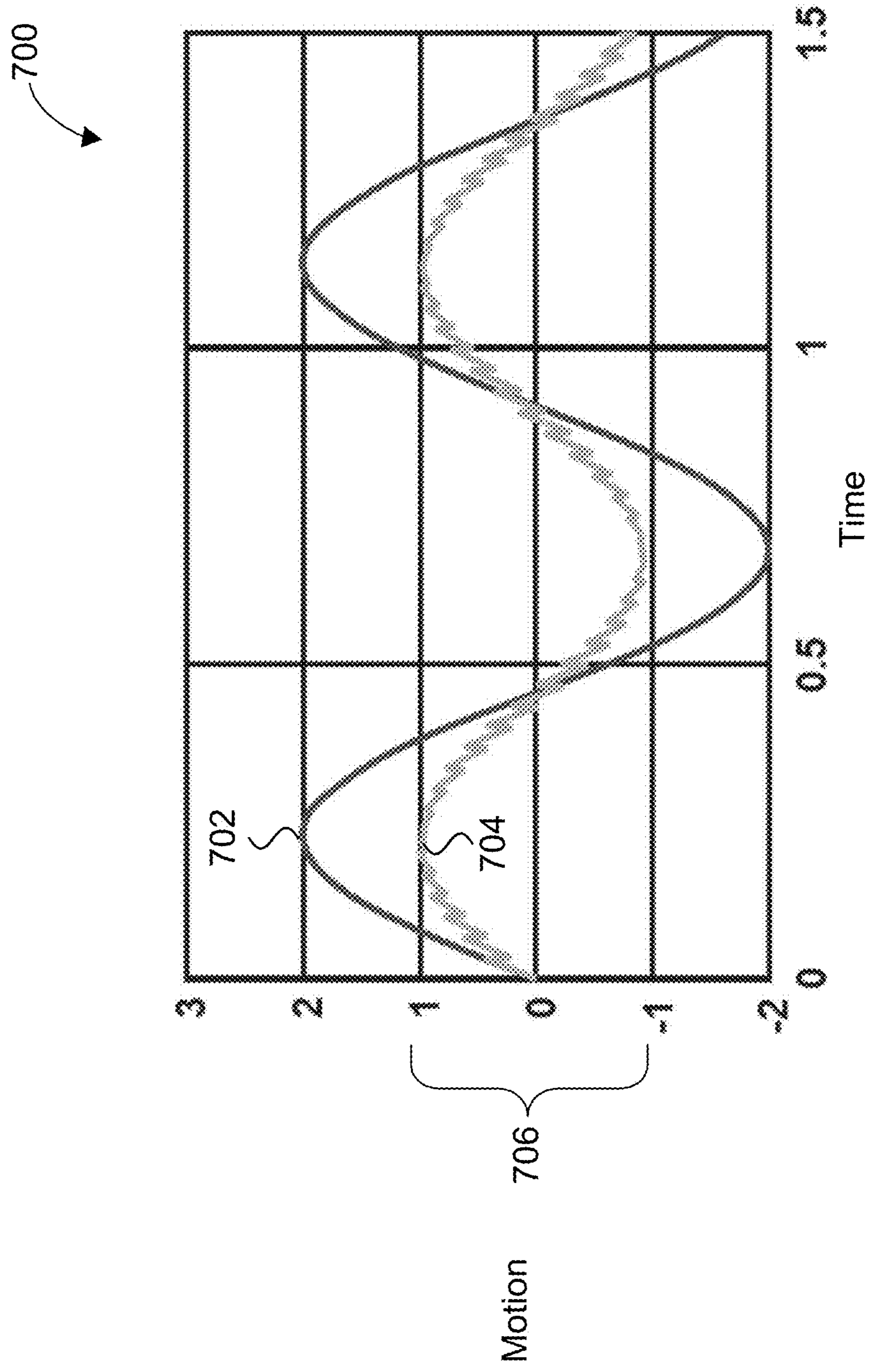
FIG. 7 includes a graph representing motion (e.g., device motion) and OIS motion, according to various aspects of the present disclosure.

FIG. 7 includes a graph 700 representing full-range recentering motion 702 and partially-recentering OIS motion 704, according to various aspects of the present disclosure. Graph 700 is an example of operations of a partially-recentering OIS mode. For example, full-range recentering OIS motion 702 illustrates motion of image-capture components that would compensate for motion of 2 degrees to −2 degrees. Most movers do not have a motion range large enough to compensate such a wide range of motion. According to a partially-recentering OIS mode, the mover of the image-capture components may move the image-capture components to compensate for motion during exposure times and may partially recenter the image-capture components (e.g., moving the image-capture components toward zero) between exposure times (and/or readout times).

For example, according to the partially-recentering OIS mode, the mover may move the image-capture components to compensate for motion during exposure times. Thus, while the image-capture components are capturing light and recording the captured light as image data, partially-recentering OIS motion 704 may compensate for (e.g., be the opposite of) the motion (e.g., having the same slope as full-range recentering OIS motion 702). Then, while the image-capture are not capturing and recording light, partially-recentering OIS motion 704 may cause the image-capture components to move toward a centered position (e.g., around zero on the motion axis). The sum of the motion and partially-recentering OIS motion 704 (not illustrated on graph 700) during the exposure times may be zero.

Because OIS motion 704 moves toward the center between capturing images, the partially-recentering OIS mode may effectively extend the motion range of the mover. For example, OIS motion 704 may (during the exposure times) compensate for motion despite the motion exceeding OIS range 706.

Figure 8:
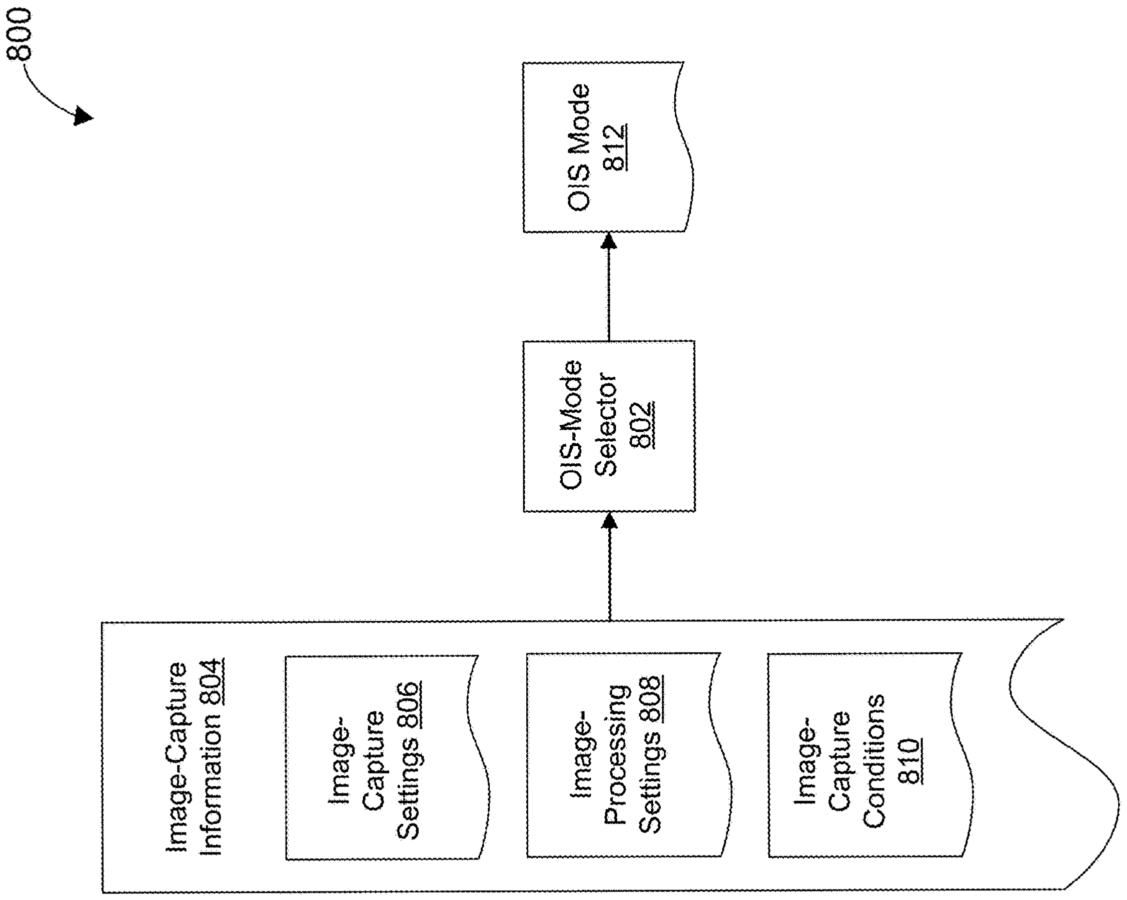
FIG. 8 is a block diagram illustrating an example system for selecting (e.g., dynamically) an OIS mode based on image-capture information, according to various aspects of the present disclosure.

FIG. 8 is a block diagram illustrating an example system 800 for selecting (e.g., dynamically) an OIS mode 812 based on image-capture information 804, according to various aspects of the present disclosure. For example, OIS-mode selector 802 may obtain image-capture information 804 (which may include image-capture settings 806, image-processing settings 808, and/or image-capture conditions 810). OIS-mode selector 802 may determine OIS mode 812 based on image-capture information 804 (e.g., based on image-capture settings 806, image-processing settings 808, and/or image-capture conditions 810).

OIS-mode selector 802 may be implemented in an image-capture system (e.g., image-processing system 100 of FIG. 1). In some aspects, OIS-mode selector 802 may be implemented in a processor (e.g., image processor 124 of FIG. 1). OIS-mode selector 802 may generate an indication of an OIS mode to use-OIS mode 812. An OIS controller may move image-capture components according to the determined OIS mode 812.

OIS mode 812 may be one of, for example, a centered OIS mode, a full-range OIS mode, a recentering OIS mode, or a partially-recentering OIS mode. The following table provides a description, some advantages of, and/or a description of situations suited to each of these OIS modes.

| OIS mode 812 | Description/Advantages/Situations |
|---|---|
| Centered OIS Mode | Image-capture components remain centered.<br>Does not help global stabilization.<br>Does not help motion blur reduction.<br>Helps lowering distortion correction artifacts due to OIS irregular/non-linear behavior.<br>Positive visual effect while pan and helps to prevent judder effect. |
| Full-Range OIS Mode | Image-capture components are moved opposite to image-capture device.<br>Helps global stabilization.<br>Helps motion blur reduction; until motion of image-capture device exceeds motion range. |
| Recentering OIS Mode | Image-capture components are moved opposite to image-capture device during exposure time and readout time and to the center position during recentering time.<br>Doesn't help global stabilization.<br>Helps motion blur reduction with effectively larger motion range. |
| Partially-Recentering OIS Mode | Image-capture components are moved opposite to image-capture device during exposure time and readout time and towards the center position during recentering time.<br>The partial-speed ratio (e.g., the speed at which the image-capture components are moved toward the center during the recentering time) can be controlled.<br>Helps global stabilization according to partial speed ratio.<br>Helps motion blur reduction and will extend the motion range according to the partial speed ratio. |

OIS-mode selector 802 may be, or may include, a set of rules, conditions, and/or thresholds used to determine OIS mode 812. For example, OIS-mode selector 802 may include thresholds for various image-capture settings 806 and OIS modes corresponding to the various thresholds. Additionally or alternatively, OIS-mode selector 802 may be, or may include, a machine-learning model trained to determine an OIS mode based on image-capture information 804.

Image-capture settings 806 of image-capture information 804 may include a focal length (e.g., a current focal length of a lens, such as lens 108 of FIG. 1 as determined and/or set by control mechanism 110 of FIG. 1 and/or focus-control mechanism 114 of FIG. 1). Additionally or alternatively, image-capture settings 806 may include a zoom factor (e.g., a current zoom factor as determined and/or set by control mechanism 110 and/or zoom-control mechanism 116 of FIG. 1 and/or a digital zoom factor). OIS-mode selector 802 may determine OIS mode 812 based on the focal length and/or zoom factor. For example, in cases in which a camera is set to digitally zoom image data by a factor of two, the camera may crop peripheral image data and maintain and/or expand central image data. The cropped peripheral image data may provide a workable margin for electronic image stabilization (EIS). Accordingly, image-capture information 804 includes an indication of digital zooming, OIS-mode selector 802 may select recentering mode.

Additionally or alternatively, image-capture settings 806 may include an exposure duration (e.g., as determined and/or set by control mechanism 110 and/or exposure-control mechanism 112 of FIG. 1). Additionally or alternatively, image-capture settings 806 may include a frame-capture rate (e.g., a rate at which individual frames of video data are being captured. Image-processing settings 808 of image-capture information 804 may include a readout duration of the device. For example, image-processing settings 808 may include an indication of a duration of readout durations 506 of FIG. 5. OIS-mode selector 802 may select OIS mode 812 based on the exposure duration, the frame-capture rate, and/or the readout duration. For example, in cases of a long exposure duration, a slow frame-capture rate, and/or a long readout duration, OIS-mode selector 802 may select a recentering OIS mode (e.g., based on there being a relatively long recentering time). In cases of a short exposure duration, a high frame-capture rate, and/or a short readout duration, OIS-mode selector 802 may partially-recentering OIS mode or a centered OIS mode (e.g., based on there being a relatively short recentering time).

Additionally or alternatively, image-capture settings 806 may include an indication of OIS capabilities of the device. For example, image-capture settings 806 may include an indication of a motion range of the image-capture components. Image-capture conditions 810 of image-capture information 804 may include motion data indicative of motion of the image-capture device. Additionally or alternatively, image-capture information 804 may include determinations regarding a motion state or an activity of the image-capture device. OIS-mode selector 802 may select OIS mode 812 based on the motion range of the image-capture components, the motion state of the image-capture, and/or the activity of the image-capture device. For example, based on an amount of motion of the image-capture device being within the motion range of the image-capture components, OIS-mode selector 802 may select a full-range OIS mode. However, if the amount of motion of the image-capture device exceeds the motion range of the image-capture components, OIS-mode selector 802 may select a recentering OIS mode or a partially-recentering OIS mode. As another example, if the motion state or activity indicates a pan, OIS-mode selector 802 may select a centered OIS mode.

Additionally or alternatively, image-capture settings 806 may include an indication of lens distortion of lenses of the device. OIS-mode selector 802 may select OIS mode 812 based on the lens distortion. A lens-distortion correction technique may correct for lens distortion. Additionally, the lens-distortion technique may compensate for OIS movement. OIS-mode selector 802 may select OIS mode 812 to enable the lens-distortion technique to compensate for the OIS motion. For example, even small errors in OIS modeling may result errors in lens-distortion modeling. Such errors may cause lead to wobble effects in video data. Thus, centering the OIS or using a recentering OIS mode, may cause the OIS to be closer to the center which may reduce the modeling error.

Additionally or alternatively, image-capture settings 806 may include an indication of a transition between sensors and/or lenses. For example, a device may include multiple image-capture devices. For instance a smart phone may include several cameras, each with a different lens, such as one camera with a wide-angle lens, another with a telephoto lens, and a third with a lens with a zoom length between the wide-angle lens and the telephoto lens. In some situations, while capturing video, the device may be zooming in or out and the device may transition from capturing fames with one camera to capturing frames with another camera of the device. Image-capture settings 806 may include an indication of such a transition. It may be beneficial to center the image-capture components before transitioning between image-capture devices to prevent issues of sensor alignment transform (SAT) mismatch with OIS positions. Additionally or alternatively, when transitioning between image-capture devices, (e.g., between an image-capture device with OIS capabilities and an image-capture device without different (or no) OIS capabilities) (and/or between image-capture devices using different exposure times) it may be desirable to create a gradual transition of blur between image frames before and after the transition.

Image-processing settings 808 may include an indication of deblur capabilities of the image-capture device. For example, the image-capture device may employ image-processing techniques to remove blur. When such techniques are available, OIS-mode selector 802 bay adjust how much OIS to employ. For example, in cases in which a deblur algorithm is available, OIS-mode selector 802 may select a full-range OIS mode more often (e.g., to allow the deblur algorithm to deblur images in which the image-capture device motion exceeds the motion range of the image-capture components while still providing stability to video data).

Figure 9:
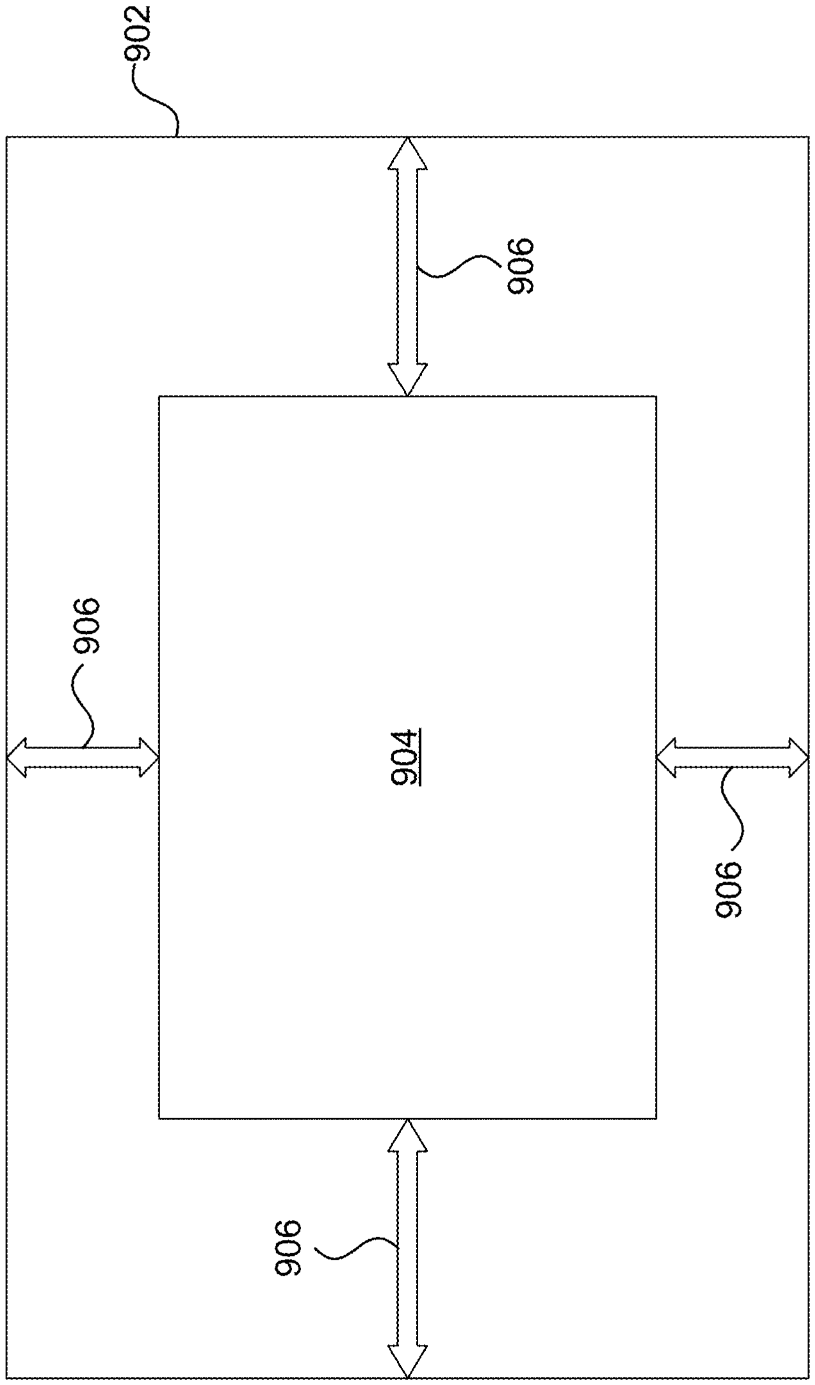
FIG. 9 includes an illustration of a field of view and an image frame to illustrate principles related to image stabilization, according to various aspects of the present disclosure.

Additionally or alternatively, image-processing settings 808 may include indications of electronic-image-stabilization (EIS) margins. For example, FIG. 9 includes an illustration of a field of view 902 and an image frame 904 to illustrate principles related to image stabilization (e.g., electronic image stabilization (EIS)), according to various aspects of the present disclosure. For instance, an image-capture device may capture an image of field of view 902, for example, an image sensor may record image data (e.g., red, green and blue pixel values) for all of field of view 902. EIS may select an image frame 904 within field of view 902 and select image data from within image frame 904. EIS may move image frame 904 within field of view 902 to compensate for motion of the image-capture device. EIS margin 906 illustrates margins between field of view 902 and image frame 904. EIS margin 906 may be based on a size of field of view 902, a size of image frame 904, and a position of image frame 904 within field of view 902. Returning to FIG. 8, image-processing settings 808 may include information regarding EIS margins (e.g., EIS margin 906 of FIG. 9).

OIS-mode selector 802 may determine OIS mode 812 based on any or all of the information included in any or all of image-capture settings 806, image-processing settings 808, and image-capture conditions 810. OIS mode 812 may be, or may include, an indication to use one of, for example, a centered OIS mode, full-range OIS mode, a recentering OIS mode, a partially-recentering OIS mode, or another OIS mode.

Additionally or alternatively, in cases in which OIS-mode selector 802 determines to use a partially-recentering OIS mode, OIS-mode selector 802 may determine a partial-speed ratio (e.g., a speed at which image-capture components may move toward the center). For example, OIS-mode selector 802 may determine a rate at which (or how much) image sensor 602 and lens 604 of FIG. 6 move from a first position (e.g., position 610) toward a second position (e.g., position 608).

In some aspects, OIS-mode selector 802 may determine OIS mode 812 on a per-axis basis. For example, OIS-mode selector 802 may determine that the image-capture device is panning in the horizontal dimension and may determine to use a centered OIS mode in the horizontal dimension and a recentering OIS mode or a full-range OIS mode in the vertical dimension. The axis may be based on the motion of the image-capture and need not be between exclusively horizontal or vertical.

In some aspects, while panning it may be desirable to for frames to exhibit motion blur in order to prevent judder in the video data. In some aspects, if there is not enough motion blur, the systems and techniques may use OIS to introduce more motion blur in order to prevent judder effect. Adding blur can be done separately per each axis, for example, blur can be added for active pan axis and not to others (for example, OIS-mode selector 802 may select a centered OIS mode on the pan axis and recentering OIS mode for other axes).

Figure 10:
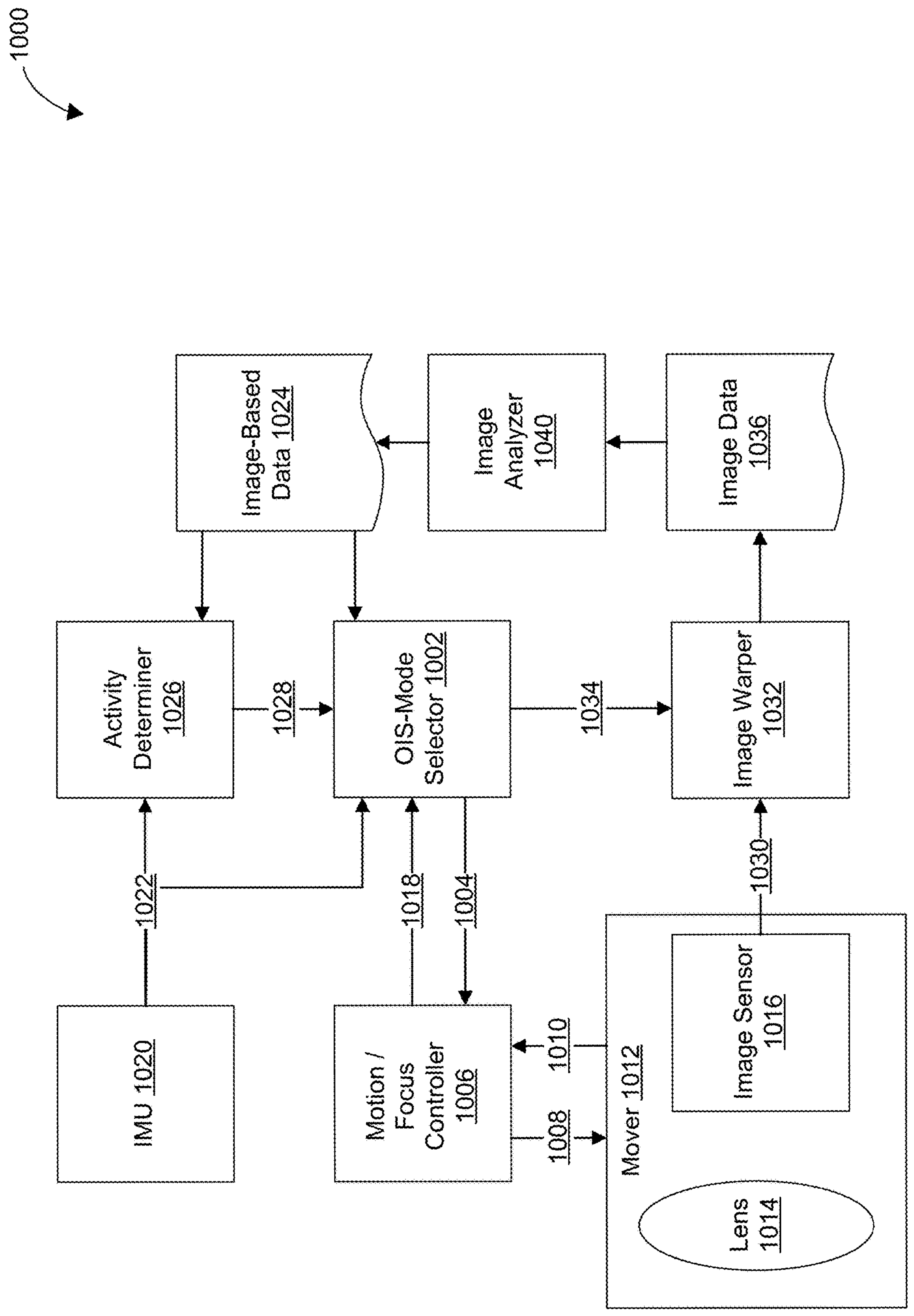
FIG. 10 is a block diagram illustrating an example system for selecting (e.g., dynamically) an OIS mode based on image-capture information, according to various aspects of the present disclosure.

FIG. 10 is a block diagram illustrating an example system 1000 for selecting (e.g., dynamically) an OIS mode 1004 based on image-capture information, according to various aspects of the present disclosure. For example, an OIS-mode selector 1002 may select OIS mode 1004 based on image-capture information 804 of FIG. 8. Further, a controller 1006 may cause a mover 1012 to move image-capture components (e.g., lens 1014 and/or image sensor 1016) based on OIS mode 1004. Further still, lens 1014 may focus light onto image sensor 1016 and image sensor 1016 may record image data 1030.

OIS-mode selector 1002 may be an example of OIS-mode selector 802 of FIG. 8. OIS-mode selector 1002 may determine OIS mode 1004 based on image-capture information 804 of FIG. 8 and provide OIS mode 1004 (e.g., an indication of the determined OIS mode) to controller 1006.

Controller 1006 may control mover 1012, which may move lens 1014 and/or image sensor 1016. Controller 1006 be implemented in, or be an example of, control mechanism 110 of FIG. 1. Controller 1006 may cause mover 1012 to move lens 1014 and/or image sensor 1016 for OIS and/or to set a focal length. Controller 1006 may send a control signal 1008 to mover 1012 to mover 1012. Further, mover 1012 may send a feedback signal 1010 to controller 1006. Mover 1012 may be, or may include, actuators and/or gimbals and the like configured to move (and/or rotate) image-capture components, such as lens 1014, a prism (not illustrated in FIG. 10), and/or image sensor 1016.

In some aspects, controller 1006 may send an indication of the position of lens 1014 ("lens position 1018") to OIS-mode selector 1002. Lens position 1018 may be determined based on feedback signal 1010. Lens position 1018 may be indicative of a focal length and/or zoom factor (e.g., of image-capture settings 806). OIS-mode selector 1002 may determine OIS mode 1004 based, at least in part, on lens position 1018.

In some aspects, OIS-mode selector 1002 may cause other changes to the way images are captured. For example, OIS-mode selector 1002 may instruct, or request, a change to a frame-capture rate, a readout duration, and/or exposure time. For example, OIS-mode selector 1002 may send an indication (not illustrated in FIG. 10) of a change to the frame-capture rate, the readout duration, and/or the exposure duration to controller 1006 (or to another portion of the image-capture device, such as control mechanisms 110 of FIG. 1) and controller 1006 (or the other portion of the image-capture device) may implement the instruction. Additional details regarding changes to the frame-capture rate, the readout duration, and/or the exposure duration are provided with regard to FIG. 12.

In some aspects, system 1000 may include an inertial measurement unit (IMU) 1020. IMU 1020 may be, or may include, one or more sensors configured to measure acceleration and/or motion of a device. IMU 1020 may generate IMU data 1022 and provide IMU data 1022 to OIS-mode selector 1002. IMU data 1022 is an example image-capture conditions 810 or data that may be included in image-capture conditions 810. In some aspects, OIS-mode selector 1002 may determine OIS mode 1004 based, at least part, on IMU data 1022.

In some aspects, system 1000 may include an activity determiner 1026 that may determine activity data 1028 based on IMU data 1022. For example, activity determiner 1026 may classify or characterize a pattern of IMU data 1022 into an activity. For example, activity determiner 1026 may determine, based on IMU data 1022 (aggregated over time), that the image-capture device is panning, that a hand of a holder of the image-capture device is shaking, that a holder of the image-capture device is running, that a head of a wearer of the image-capture device is shaking, etc. Activity determiner 1026 may provide activity data 1028 to OIS-mode selector 1002 and OIS-mode selector 1002 may determine OIS mode 1004 based, at least in part, on activity data 1028. Activity data 1028 is an example image-capture conditions 810 or data that may be included in image-capture conditions 810.

In some aspects, system 1000 may include an image warper 1032 that may be used to geometrically reshape image data 1030 to generate image data 1036. OIS-mode selector 1002 may provide image warper 1032 with Quanta Image Sensor (QIS) transform 1034 and image warper 1032 may reshape image data 1030 according to QIS transform 1034.

In some aspects, system 1000 may include an image analyzer 1040 that may analyze image data 1036 (or image data 1030) and generate image-based data 1024 based on the analysis. For example, image analyzer 1040 may perform motion analysis (e.g., an optical flow analysis) on image data 1036. In some aspects, image analyzer 1040 may provide image-based data 1024 to OIS-mode selector 1002 and OIS-mode selector 1002 may generate OIS mode 1004 (for a to be captured image) based, at least in part, on image-based data 1024. For example, OIS-mode selector 1002 may determine motion information relative to the image-capture device based, at least in part, on image-based data 1024. In some aspects, image analyzer 1040 may provide image-based data 1024 to activity determiner 1026, and activity determiner 1026 may determine activity data 1028 based, at least in part, on image-based data 1024 and OIS-mode selector 1002 may determine OIS mode 1004 based, at least in part, on activity data 1028.

Additionally or alternatively, in some aspects, image analyzer 1040 may determine a blurriness of image data 1036 and OIS-mode selector 1002 may determine OIS mode 1004 (for a to be captured image) based on the blurriness of image data 1036. For example, system 1000 may implement a feedback loop to decrease blurriness of image data 1036.

In some aspects, OIS-mode selector 1002 may provide OIS mode 1004 to an electronic image stabilization (EIS) algorithm and the EIS algorithm may determine EIS based on OIS mode 1004. For example, in some cases, an OIS mode affect how an EIS algorithm will select a frame (e.g., image frame 904 of FIG. 9). For example, in cases in which OIS modes switch, the switching of the OIS mode may impact margins (e.g., EIS margin 906 of FIG. 9) for the EIS algorithm. A forward-looking EIS algorithm may adjust parameters of the EIS algorithm and/or determine a frame based on an OIS mode or upcoming OIS mode.

Figure 11:
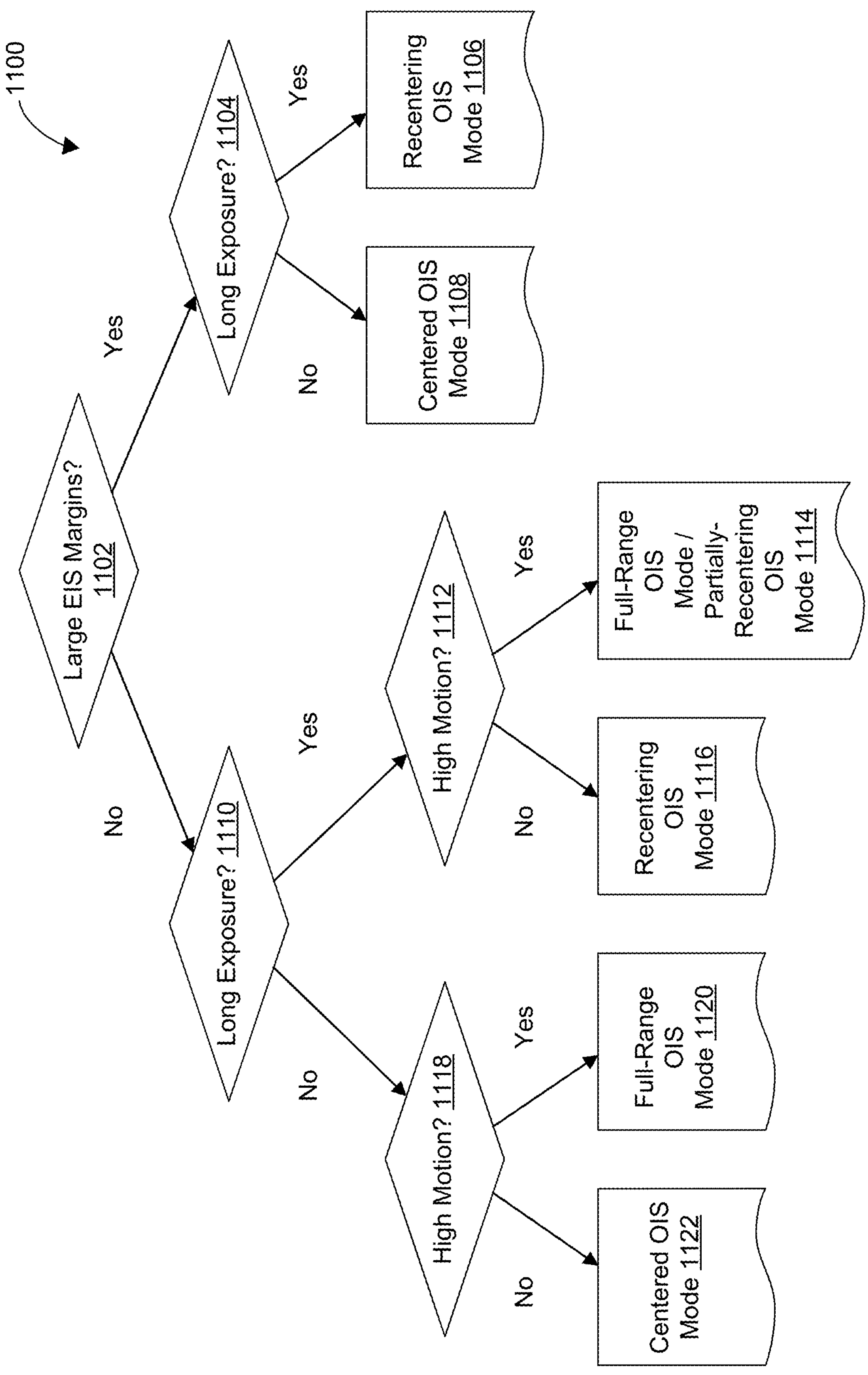
FIG. 11 includes a flowchart to illustrate an example process of how an OIS mode may be determined, according to various aspects of the present disclosure.

FIG. 11 includes a flowchart to illustrate an example process 1100 of how an OIS mode may be determined, according to various aspects of the present disclosure. For example, OIS-mode selector 802 of FIG. 8, or OIS-mode selector 1002 of FIG. 10 may implement process 1100 or a similar process.

At decision block 1102, a determination may be made based on a width of EIS margins. For example, at decision block 1102, it may be determined whether an EIS margin for an image (e.g., EIS margin 906 of FIG. 9) exceed a threshold. The width of the EIS margin may relate to how much stabilization EIS is able to provide to an image. If the EIS margin is large, EIS May provide a good deal of stabilization and OIS may not need to prioritize stabilization. If the EIS margin exceeds the threshold, process 1100 may proceed to decision block 1104. If the EIS margin does not exceed the threshold, process 1100 may proceed to decision block 1110.

At decision block 1104, a determination may be made based on an exposure duration. For example, at decision block 1104, it may be determined whether an exposure duration for an image exceeds a threshold. Images captured over long exposure durations may be more subject to motion blur that images captured over short exposure durations because the image-capture device may move more during a long exposure duration than during a short exposure duration. Accordingly, process 1100 may apply OIS modes (e.g., recentering OIS mode) to images captured over long exposure durations. If the exposure duration exceeds the threshold, process 1100 may conclude in the selection recentering OIS mode at determination 1106. If the exposure duration does not exceed the threshold, process 1100 may conclude in the selection centered OIS mode at determination 1108.

Similarly, at decision block 1110, a determination may be made based on an exposure duration. For example, at decision block 1110, it may be determined whether an exposure duration for an image exceeds a threshold. If the exposure duration exceeds the threshold, process 1100 may proceed to decision block 1112. If the exposure duration does not exceed the threshold, process 1100 may proceed to decision block 1118.

At decision block 1112, a determination may be made based on movement of the image-capture device. For example, at decision block 1112, it may be determined whether an amount of movement of the image-capture device exceeds a threshold. Additionally or alternatively, the determination made at decision block 1112 may be based on a determined motion state or activity of the image-capture device. Images captured by a moving image-capture device may be more subject to motion blur that images captured by stationary image-capture devices. Accordingly, process 1100 may apply OIS modes (e.g., recentering OIS mode) to images captured by moving image-capture devices. If the motion exceeds the threshold, process 1100 may conclude in the selection full-range OIS mode or the partially-recentering OIS mode at determination 1114. If the motion does not exceed the threshold, process 1100 may conclude in the selection recentering OIS mode at determination 1116.

Similarly, at decision block 1118, a determination may be made based on movement of the image-capture device. For example, at decision block 1118, it may be determined whether an amount of movement of the image-capture device exceeds a threshold. Additionally or alternatively, the determination made at decision block 1118 may be based on a determined motion state or activity of the image-capture device. If the motion exceeds the threshold, process 1100 may conclude in the selection full-range OIS mode at determination 1120. If the motion does not exceed the threshold, process 1100 may conclude in the selection centered OIS mode at determination 1122.

FIG. 12A, FIG. 12B, FIG. 12C, and FIG. 12D include illustrations of several example duration during which multiple image frames (e.g., of video data) may be captured, according to various aspects of the present disclosure. For instance, example duration 1202 of FIG. 12A may be ⅙th of a second. An image-capture device may be capturing frames at a rate of 30 frames per second (fps). Thus, during example duration 1202, the image-capture device may capture 5 frames. Capturing the five frames may include measuring light at the image sensor during exposure durations 1204 (which may each be 10 milliseconds (ms) in duration) and reading measure light values from the image sensor during readout durations 1206 (which may each be 10 ms in duration). At a frame-capture rate of 30 fps, and with an exposure duration of 10 ms and a readout duration of 10 ms, there may be 13.333 ms of unused time between capturing frames. For example, unused time may be equal to the reciprocal of the frame-capture rate (e.g., 1/30 frames per second) minus the exposure duration, minus the readout duration. Unused time may be referred to, in the art, as "blank time" or "non-exposure time." As an example, unused time may be calculated according to:

unused time=1/frame-capture rate−exposure duration−readout duration

A recentering OIS mode (or partially-recentering OIS mode) may use the time between capturing frames as a time to recenter the image-capture components. Accordingly, the times between capturing frames may be referred to as recentering durations 1208.

The systems and techniques of the present disclosure may adjust any or all of the frame-capture rate, the exposure duration, and/or the readout duration to ensure that that the recentering time is sufficiently long. For example, recentering may take, at a minimum, 10 ms. The systems and techniques may adjust any or all of the frame-capture rate, exposure durations 1204, and/or the readout durations 1206 to cause the recentering durations 1208 to be at least 10 ms.

Figure 12A:
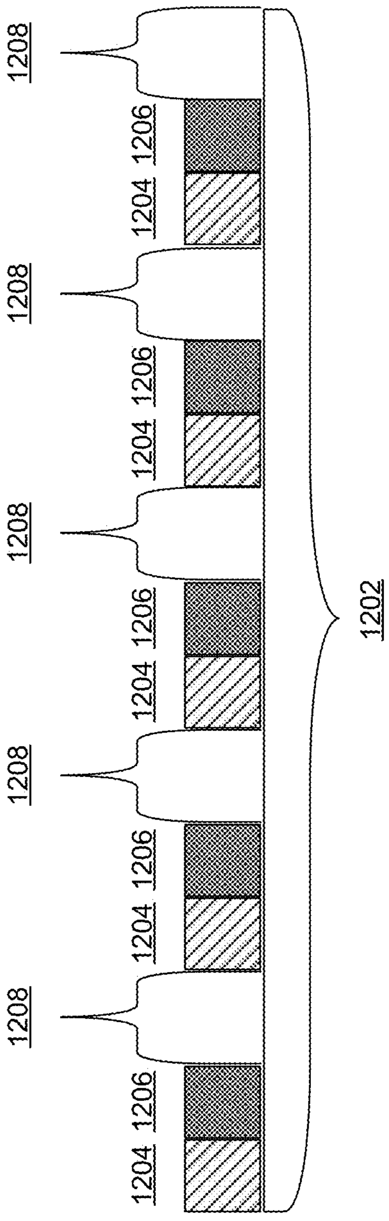
FIG. 12A includes an illustration of an example duration during which multiple image frames (e.g., of video data) may be captured, according to various aspects of the present disclosure.

A first example, illustrated by example duration 1202, exposure durations 1204, and readout durations 1206 of FIG. 12A, at a frame-capture rate of 30 fps may leave sufficient time for recentering durations 1208. For example, according to the first example, recentering durations 1208 may be 13.333 ms.

Figure 12B:
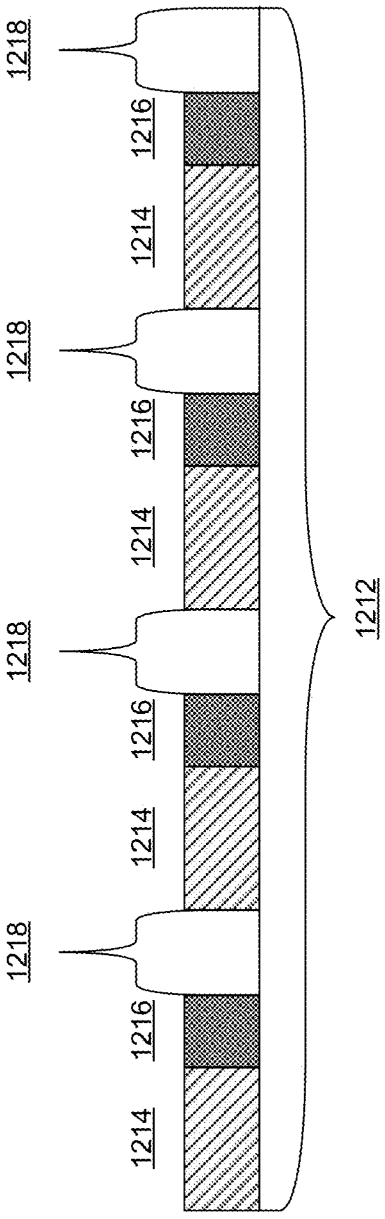
FIG. 12B includes an illustration of an example duration during which multiple image frames (e.g., of video data) may be captured, according to various aspects of the present disclosure.

In a second example, illustrated by example duration 1212, exposure durations 1214, and readout durations 1216 of FIG. 12B, exposure durations 1214 may be increased to 20 ms (e.g., by an automatic exposure control (AEC), such as exposure-control mechanism 112 of FIG. 1). With exposure durations 1214 being 20 ms and readout durations 1216 being 10 ms, a frame-capture rate of 30 fps may not leave enough time for recentering durations 1218 to be 10 ms, or longer. The systems and techniques may adjust the frame-capture rate to cause recentering durations 1218 to be at least 10 ms. For example, the systems and techniques may set the frame-capture rate to 24 fps. In the example illustrated in FIG. 12B, a frame capture rate of 24 fps may result in capturing 4 frames during the ⅙th second duration of example duration 1212.

Figure 12C:
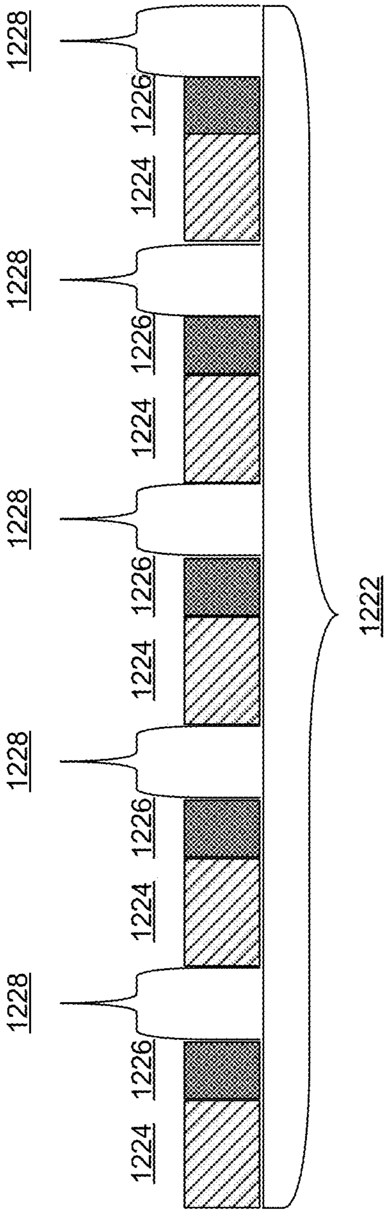
FIG. 12C includes an illustration of an example duration during which multiple image frames (e.g., of video data) may be captured, according to various aspects of the present disclosure.

In a third example, illustrated by example duration 1222, exposure durations 1224, and readout durations 1226 of FIG. 12C, exposure durations 1224 may be increased to 15 ms (e.g., by an automatic exposure control (AEC), such as exposure-control mechanism 112 of FIG. 1). With exposure durations 1224 being 15 ms, readout durations 1226 being 10 ms, a frame-capture rate of 30 fps may not leave enough time for recentering durations 1228 to be 10 ms, or longer.

The systems and techniques may adjust the readout durations 1226 to cause recentering durations 1228 to be at least 10 ms. For example, the systems and techniques may set readout durations 1226 to be 8.333 ms. In the example illustrated in FIG. 12C, a readout duration of 8.333 ms may result in recentering durations 1228 being 10 ms. Decreasing readout durations 1226 may come at a power cost.

Figure 12D:
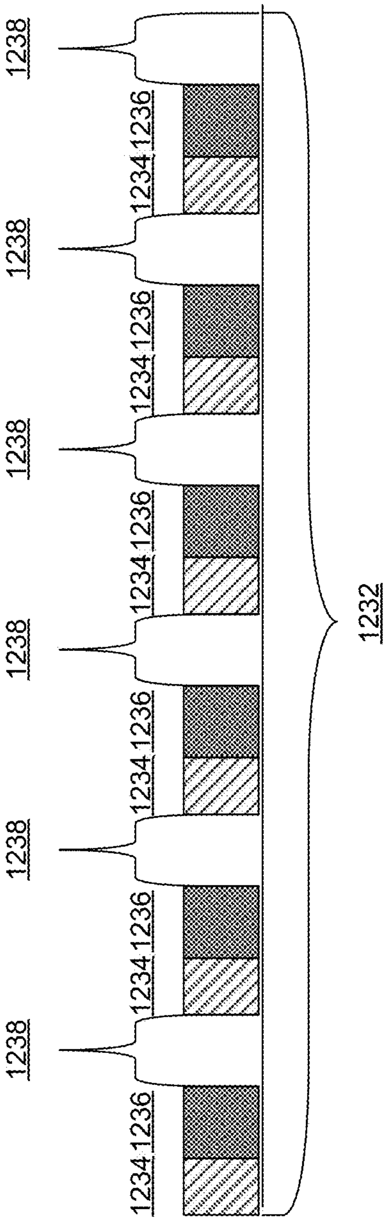
FIG. 12D includes an illustration of an example duration during which multiple image frames (e.g., of video data) may be captured, according to various aspects of the present disclosure.

In a fourth example, illustrated by example duration 1232, exposure durations 1234, and readout durations 1236 of FIG. 12D, a frame-capture rate may be increased to 36 fps. With exposure durations 1224 being 10 ms, readout durations 1226 being 10 ms, a frame-capture rate of 36 fps may not leave enough time for recentering durations 1228 to be 10 ms, or longer. The systems and techniques may adjust the exposure durations 1234 to cause recentering durations 1238 to be at least 10 ms. For example, the systems and techniques may set exposure durations 1234 to be 7.777 ms. In the example illustrated in FIG. 12D, an exposure duration of 7.777 ms may result in recentering durations 1238 being 10 ms. Decreasing exposure durations 1234 may come at a cost to image quality.

Figure 13:
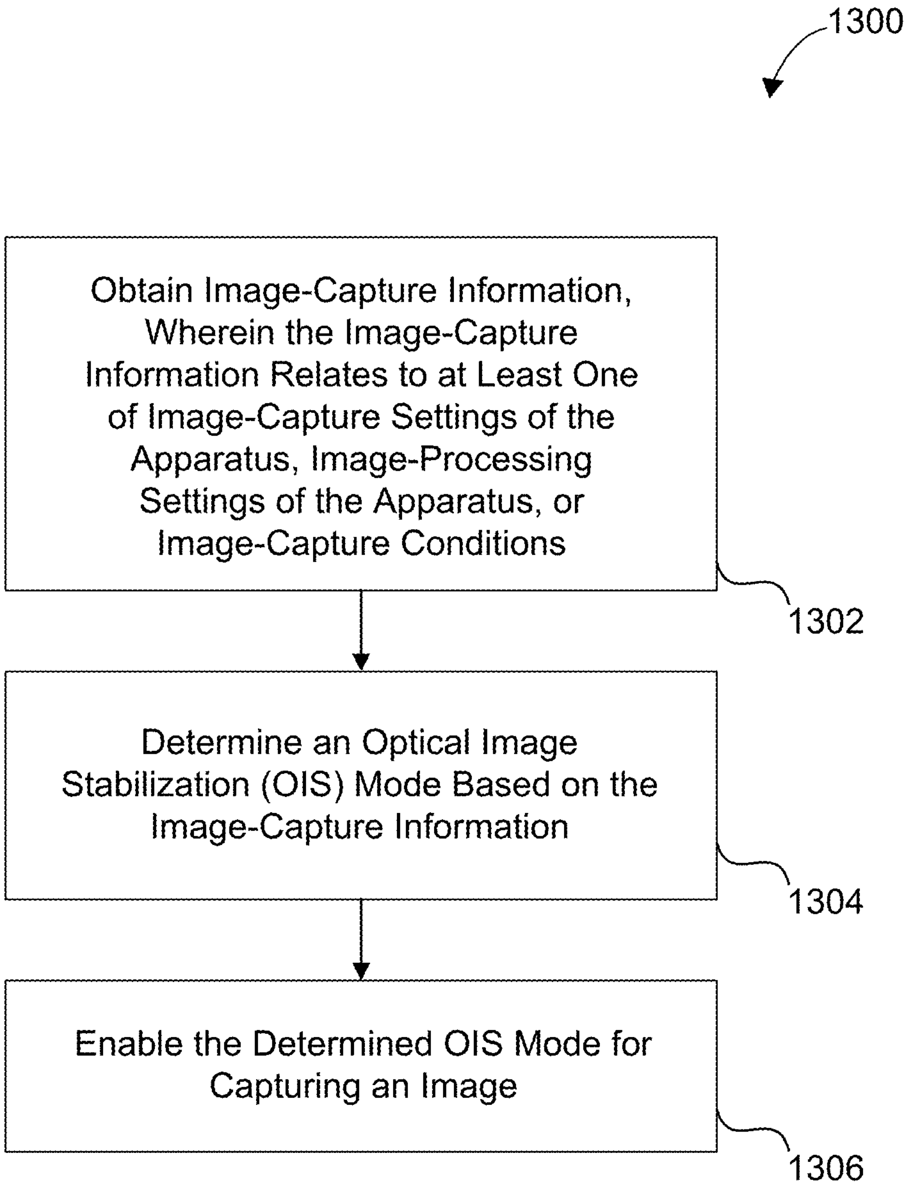
FIG. 13 is a flow diagram illustrating another example process for determining (e.g., dynamically) an OIS mode, in accordance with aspects of the present disclosure.

FIG. 13 is a flow diagram illustrating a process 1300 for determining (e.g., dynamically) an OIS mode, in accordance with aspects of the present disclosure. One or more operations of process 1300 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 1300. The one or more operations of process 1300 may be implemented as software components that are executed and run on one or more processors.

At block 1302, a computing device (or one or more components thereof) may obtain image-capture information, wherein the image-capture information relates to at least one of image-capture settings of the computing device, image-processing settings of the computing device, or image-capture conditions. For example, OIS-mode selector 802 of FIG. 8 may obtain image-capture information 804. As another example, OIS-mode selector 1002 of FIG. 10 may obtain image-capture information. The image-capture information may relate to image-capture settings of the computing device, image-processing settings of the computing device, and/or image-capture conditions.

In some aspects, the image-capture information may be, or may include, motion data indicative of motion of the computing device; an indication of OIS capabilities of the computing device; a focal length; a zoom factor; an electronic image stabilization (EIS) margin; an indication of lens distortion; an exposure duration; a readout duration; a frame-capture rate; an indication of a transition between sensors of the computing device; and/or an indication of post-processing capabilities of the computing device. For example, OIS-mode selector 1002 of FIG. 10 may obtain IMU data 1022 from IMU 1020, lens position 1018 from controller 1006, an indication of OIS capabilities, a focal length, a zoom factor, an EIS margin, an indication of lens distortion, an exposure duration, a readout duration, a frame-capture rate, an indication of a transition between sensors of the computing device, and/or an indication of post-processing capabilities.

In some aspects, the image-capture information may be, or may include, an electronic image stabilization (EIS) margin; an exposure duration; or motion data indicative of motion of the computing device. For example, OIS-mode selector 1002 of FIG. 10 may obtain an indication of an EIS margin, an exposure duration, and IMU data 1022.

At block 1304, the computing device (or one or more components thereof) may determine an optical image stabilization (OIS) mode based on the image-capture information. For example, OIS-mode selector 802 of FIG. 8 may determine OIS mode 812. As another example, OIS-mode selector 1002 of FIG. 10 may determine OIS mode 1004.

In some aspects, the determined OIS mode is determined from among: a centered OIS mode; a full-range OIS mode; a recentering OIS mode; and a partially-recentering OIS mode. For example, OIS mode 812 of FIG. 8 or OIS mode 1004 of FIG. 10 may be selected from among: a centered OIS mode, a full-range OIS mode, a recentering OIS mode, or a partially-recentering OIS mode.

In some aspects, the computing device (or one or more components thereof) may determine the OIS mode based on an electronic image stabilization (EIS) margin; an exposure duration; or motion data indicative of motion of the computing device. For example, OIS-mode selector OIS-mode selector 802 of FIG. 8, or 1002 of FIG. 10, may implement process 1100 of FIG. 11 to determine the OIS mode.

For example, the computing device (or one or more components thereof) may, based on the EIS margin exceeding an EIS-margin threshold and the exposure duration exceeding an exposure-duration threshold, determine a recentering OIS mode as the determined OIS mode.

Additionally or alternatively, the computing device (or one or more components thereof) may, based on the EIS margin exceeding an EIS-margin threshold and the exposure duration not exceeding an exposure-duration threshold, determine a centered OIS mode as the determined OIS mode.

Additionally or alternatively, the computing device (or one or more components thereof) may based on the EIS margin not exceeding an EIS-margin threshold, the exposure duration exceeding an exposure-duration threshold, and the motion data exceeding a motion-data threshold, determine a full-range OIS mode as the determined OIS mode.

Additionally or alternatively, the computing device (or one or more components thereof) may, based on the EIS margin not exceeding an EIS-margin threshold, the exposure duration exceeding an exposure-duration threshold, and the motion data not exceeding a motion-data threshold, determine a recentering OIS mode as the determined OIS mode.

Additionally or alternatively, the computing device (or one or more components thereof) may, based on the EIS margin not exceeding an EIS-margin threshold, and the exposure duration exceeding an exposure-duration threshold, determine a partially-recentering OIS mode as the determined OIS mode; and determine a motion factor for the partially-recentering OIS mode. For instance, the following formulation may be used to determine the motion factor (denoted as $\alpha_{sync\text{-}ois}$):

$$\alpha_{sync\text{-}ois} := F(\text{EIS margins, device motion, sensor parameters, } \ldots)$$

The EIS margins can also be referred to as stabilization margins.

Additionally or alternatively, the computing device (or one or more components thereof) may, based on the EIS margin not exceeding an EIS-margin threshold, the exposure duration not exceeding an exposure-duration threshold, and the motion data exceeding a motion-data threshold, determine a full-range OIS mode as the determined OIS mode.

Additionally or alternatively, the computing device (or one or more components thereof) may, based on the EIS margin not exceeding an EIS-margin threshold, the exposure duration not exceeding an exposure-duration threshold, and the motion data not exceeding a motion-data threshold, determine a centered OIS mode as the determined OIS mode.

At block 1306, the computing device (or one or more components thereof) may enable the determined OIS mode for capturing an image. For example, controller 1006 of FIG. of FIG. 10 may enable the OIS mode determined at block 1304.

In some aspects, the computing device (or one or more components thereof) may adjust a frame-capture rate of the computing device to allow for recentering duration between capturing of frames. For example, OIS-mode selector 1002 of determine an adjustment to a frame-capture rate of an image-capture device, for example, as described with regard to FIG. 12B.

In some aspects, the computing device (or one or more components thereof) may to adjust a readout duration of the computing device to allow for recentering duration between capturing of frames. For example, OIS-mode selector 1002 may determine an adjustment to a readout duration of the image-capture device, for example, as described with regard to FIG. 12C.

In some aspects, in cases in which the OIS mode is a partially-recentering OIS mode the computing device (or one or more components thereof) may determine a recentering rate based on the image-capture information. For example, OIS-mode selector 1002 may determine a rate at which image-capture components move toward a center position.

In some aspects, the computing device (or one or more components thereof) may provide an indication of the determined OIS mode to an electronic-image-stabilization (EIS) engine. For example, OIS-mode selector 1002 of FIG. 10 may provide OIS mode 1004 to an EIS engine to enable the EIS engine to adjust parameters based on the OIS mode determined at block 1304. In some aspects, the computing device (or one or more components thereof) may adjust electronic-image-stabilization (EIS) parameters based on the determined OIS mode. For example, the computing device (or one or more components thereof) implementing OIS-mode selector 1002 may also implement an EIS engine and adjust parameters of the EIS engine based on the OIS mode determined at block 1304.

In some aspects, the image-capture information may be, or may include, first image-capture information related to a first time instance. The determined OIS mode may be, or may include, a first determined OIS mode. The image may be, or may include, a first image. The computing device (or one or more components thereof) may obtain second image-capture information related to a second time instance; determine a second OIS mode based on the second image-capture information; and enable the second determined OIS mode while a second image is captured. For example, after determining and enabling a first OIS mode, OIS-mode selector 1002 may receive additional image-capture information and determine a second OIS mode and enable the second OIS mode.

In some examples, as noted previously, the methods described herein (e.g., process 1100 of FIG. 11, process 1300 of FIG. 13, and/or other methods described herein) can be performed, in whole or in part, by a computing device or apparatus. In one example, one or more of the methods can be performed by OIS-mode selector 802 of FIG. 8, OIS-mode selector 1002 of FIG. 10, or by another system or device. In another example, one or more of the methods (e.g., process 1100 process 1300, and/or other methods described herein) can be performed, in whole or in part, by the computing-device architecture 1500 shown in FIG. 15. For instance, a computing device with the computing-device architecture 1500 shown in FIG. 15 can include, or be included in, the components of the OIS-mode selector 802 and/or OIS-mode selector 1002 and can implement the operations of process 1100, process 1300, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 1100, process 1300, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1100, process 1300, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

As noted above, various aspects of the present disclosure can use machine-learning models or systems.

Figure 14:
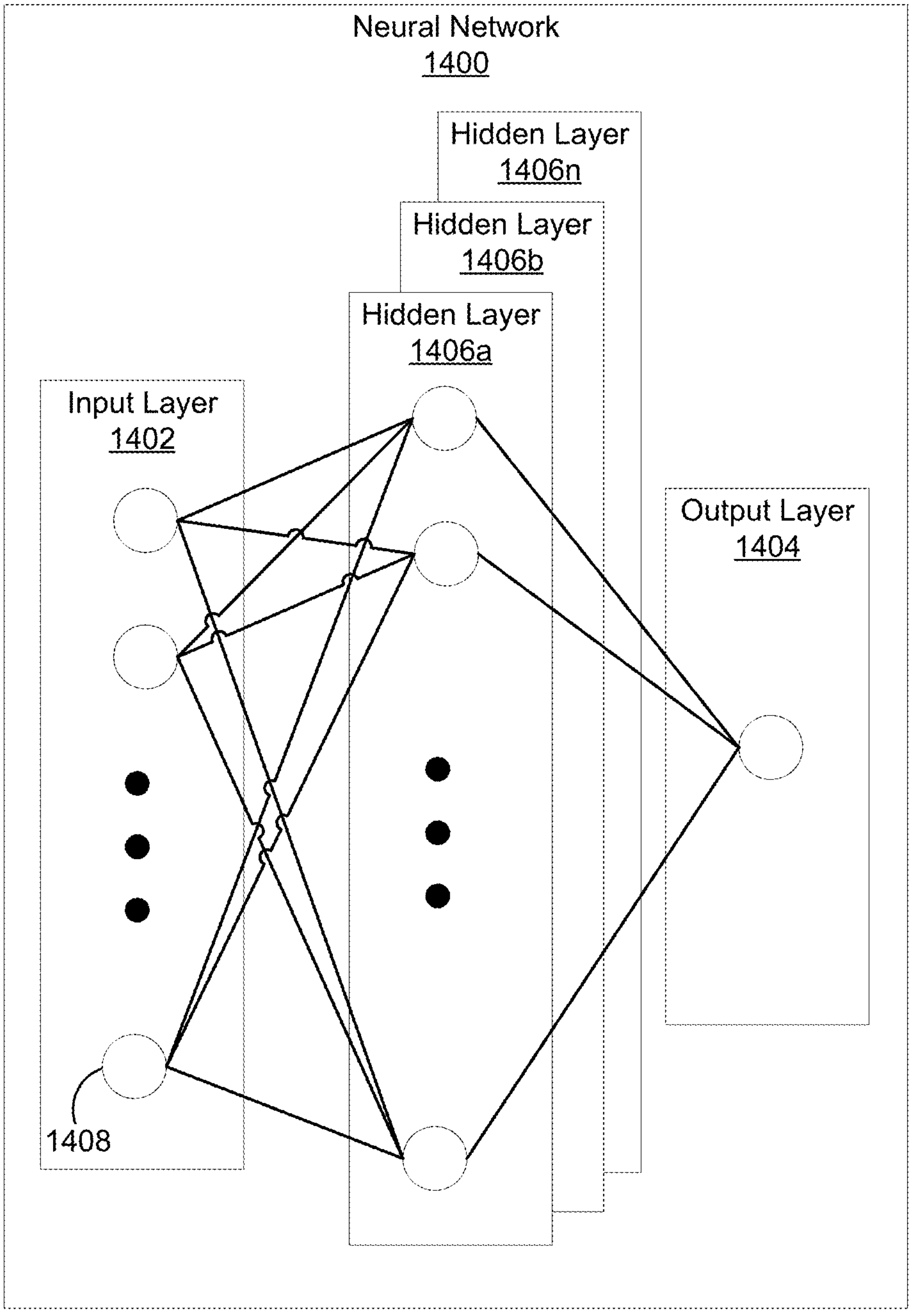
FIG. 14 is a block diagram illustrating an example of a deep learning neural network that can be used to perform various tasks, according to some aspects of the disclosed technology.

FIG. 14 is an illustrative example of a neural network 1400 (e.g., a deep-learning neural network) that can be used to implement machine-learning based feature segmentation, implicit-neural-representation generation, rendering, classification, object detection, image recognition (e.g., face recognition, object recognition, scene recognition, etc.), feature extraction, authentication, gaze detection, gaze prediction, and/or automation. For example, neural network 1400 may be an example of, or can implement, OIS-mode selector 802 of FIG. 8, and/or OIS-mode selector 1002 of FIG. 10.

An input layer 1402 includes input data. In one illustrative example, input layer 1402 can include data representing image-capture information 804 of FIG. 8, image-capture settings 806 of FIG. 8, image-processing settings 808, of FIG. 8, lens position 1018 of FIG. 10, IMU data 1022 of FIG. 10, IMU data 1022 of FIG. 10, and/or image-based data 1024 of FIG. 10. Neural network 1400 includes multiple hidden layers, for example, hidden layers 1406*a*, 1406*b*, through 1406*n*. The hidden layers 1406*a*, 1406*b*, through hidden layer 1406*n* include "n" number of hidden layers, where "n" is an integer greater than or equal to one. The number of hidden layers can be made to include as many layers as needed for the given application. Neural network 1400 further includes an output layer 1404 that provides an output resulting from the processing performed by the hidden layers 1406*a*, 1406*b*, through 1406*n*. In one illustrative example, output layer 1404 can provide OIS mode 812 of FIG. 8, and/or OIS mode 1004 of FIG. 10.

Neural network 1400 may be, or may include, a multi-layer neural network of interconnected nodes. Each node can represent a piece of information. Information associated with the nodes is shared among the different layers and each layer retains information as information is processed. In some cases, neural network 1400 can include a feed-forward network, in which case there are no feedback connections where outputs of the network are fed back into itself. In some cases, neural network 1400 can include a recurrent neural network, which can have loops that allow information to be carried across nodes while reading in input.

Information can be exchanged between nodes through node-to-node interconnections between the various layers. Nodes of input layer 1402 can activate a set of nodes in the first hidden layer 1406*a*. For example, as shown, each of the input nodes of input layer 1402 is connected to each of the nodes of the first hidden layer 1406*a*. The nodes of first hidden layer 1406*a* can transform the information of each input node by applying activation functions to the input node information. The information derived from the transformation can then be passed to and can activate the nodes of the next hidden layer 1406*b*, which can perform their own designated functions. Example functions include convolutional, up-sampling, data transformation, and/or any other suitable functions. The output of the hidden layer 1406*b* can then activate nodes of the next hidden layer, and so on. The output of the last hidden layer 1406*n* can activate one or more nodes of the output layer 1404, at which an output is provided. In some cases, while nodes (e.g., node 1408) in neural network 1400 are shown as having multiple output lines, a node has a single output and all lines shown as being output from a node represent the same output value.

In some cases, each node or interconnection between nodes can have a weight that is a set of parameters derived from the training of neural network 1400. Once neural network 1400 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 1400 to be adaptive to inputs and able to learn as more and more data is processed.

Neural network 1400 may be pre-trained to process the features from the data in the input layer 1402 using the different hidden layers 1406*a*, 1406*b*, through 1406*n* in order to provide the output through the output layer 1404. In an example in which neural network 1400 is used to identify features in images, neural network 1400 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 10 0 0 0 0 0 0].

In some cases, neural network 1400 can adjust the weights of the nodes using a training process called backpropagation. As noted above, a backpropagation process can include a forward pass, a loss function, a backward pass, and a weight update. The forward pass, loss function, backward pass, and parameter update are performed for one training iteration. The process can be repeated for a certain number of iterations for each set of training images until neural network 1400 is trained well enough so that the weights of the layers are accurately tuned.

For the example of identifying objects in images, the forward pass can include passing a training image through neural network 1400. The weights are initially randomized before neural network 1400 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 1400, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 1400 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as. The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 1400 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as, where w denotes a weight, $w_i$ denotes the initial weight, and $\eta$ denotes a learning rate. The learning rate can be set to any suitable value, with a high learning rate including larger weight updates and a lower value indicating smaller weight updates.

Neural network 1400 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 1400 can include any other deep network other than a CNN, such as an autoencoder, a deep belief nets (DBNs), a Recurrent Neural Networks (RNNs), among others.

FIG. 15 illustrates an example computing-device architecture 1500 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1500 may include, implement, or be included in any or all of OIS-mode selector 802 of FIG. 8, OIS-mode selector 1002 of FIG. 12, and/or other devices, modules, or systems described herein. Additionally or alternatively, computing-device architecture 1500 may be configured to perform process 1300, and/or other process described herein.

The components of computing-device architecture 1500 are shown in electrical communication with each other using connection 1512, such as a bus. The example computing-device architecture 1500 includes a processing unit (CPU or processor) 1502 and computing device connection 1512 that couples various computing device components including computing device memory 1510, such as read only memory (ROM) 1508 and random-access memory (RAM) 1506, to processor 1502.

Computing-device architecture 1500 can include a cache of high-speed memory connected directly with, in close proximity to, or integrated as part of processor 1502. Computing-device architecture 1500 can copy data from memory 1510 and/or the storage device 1514 to cache 1504 for quick access by processor 1502. In this way, the cache can provide a performance boost that avoids processor 1502 delays while waiting for data. These and other modules can control or be configured to control processor 1502 to perform various actions. Other computing device memory 1510 may be available for use as well. Memory 1510 can include multiple different types of memory with different performance characteristics. Processor 1502 can include any general-purpose processor and a hardware or software service, such as service 1 1516, service 2 1518, and service 3 1520 stored in storage device 1514, configured to control processor 1502 as well as a special-purpose processor where software instructions are incorporated into the processor design. Processor 1502 may be a self-contained system, containing multiple cores or processors, a bus, memory controller, cache, etc. A multi-core processor may be symmetric or asymmetric.

To enable user interaction with the computing-device architecture 1500, input device 1522 can represent any number of input mechanisms, such as a microphone for speech, a touch-sensitive screen for gesture or graphical input, keyboard, mouse, motion input, speech and so forth. Output device 1524 can also be one or more of a number of output mechanisms known to those of skill in the art, such as a display, projector, television, speaker device, etc. In some instances, multimodal computing devices can enable a user to provide multiple types of input to communicate with computing-device architecture 1500. Communication interface 1526 can generally govern and manage the user input and computing device output. There is no restriction on operating on any particular hardware arrangement and therefore the basic features here may easily be substituted for improved hardware or firmware arrangements as they are developed.

Storage device 1514 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1506, read only memory (ROM) 1508, and hybrids thereof. Storage device 1514 can include services 1516, 1518, and 1520 for controlling processor 1502. Other hardware or software modules are contemplated. Storage device 1514 can be connected to the computing device connection 1512. In one aspect, a hardware module that performs a particular function can include the software component stored in a computer-readable medium in connection with the necessary hardware components, such as processor 1502, connection 1512, output device 1524, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for capturing image data, the apparatus comprising: at least one memory; and at least one processor coupled to the at least one memory and configured to: obtain image-capture information, wherein the image-capture information relates to at least one of image-capture settings of the apparatus, image-processing settings of the apparatus, or image-capture conditions; determine an optical image stabilization (OIS) mode based on the image-capture information; and enable the determined OIS mode for capturing an image.

Aspect 2. The apparatus of aspect 1, wherein the image-capture information comprises at least one of: motion data indicative of motion of the apparatus; an indication of OIS capabilities of the apparatus; a focal length; a zoom factor; an electronic image stabilization (EIS) margin; an indication of lens distortion; an exposure duration; a readout duration; a frame-capture rate; an indication of a transition between sensors of the apparatus; or an indication of post-processing capabilities of the apparatus.

Aspect 3. The apparatus of any one of aspects 1 or 2, wherein the image-capture information comprises at least one of: an electronic image stabilization (EIS) margin; an exposure duration; or motion data indicative of motion of the apparatus.

Aspect 4. The apparatus of aspect 3, wherein the at least one processor is further configured to, based on the EIS margin exceeding an EIS-margin threshold and the exposure duration exceeding an exposure-duration threshold, determine a recentering OIS mode as the determined OIS mode.

Aspect 5. The apparatus of aspect 3, wherein the at least one processor is further configured to, based on the EIS margin exceeding an EIS-margin threshold and the exposure duration not exceeding an exposure-duration threshold, determine a centered OIS mode as the determined OIS mode.

Aspect 6. The apparatus of aspect 3, wherein the at least one processor is further configured to, based on the EIS margin not exceeding an EIS-margin threshold, the exposure duration exceeding an exposure-duration threshold, and the motion data exceeding a motion-data threshold, determine a full-range OIS mode as the determined OIS mode.

Aspect 7. The apparatus of aspect 3, wherein the at least one processor is further configured to, based on the EIS margin not exceeding an EIS-margin threshold, the exposure duration exceeding an exposure-duration threshold, and the motion data not exceeding a motion-data threshold, determine a recentering OIS mode as the determined OIS mode.

Aspect 8. The apparatus of aspect 3, wherein the at least one processor is further configured to, based on the EIS margin not exceeding an EIS-margin threshold, and the exposure duration exceeding an exposure-duration threshold, determine a partially-recentering OIS mode as the determined OIS mode; and determine a motion factor for the partially-recentering OIS mode.

Aspect 9. The apparatus of aspect 3, wherein the at least one processor is further configured to, based on the EIS margin not exceeding an EIS-margin threshold, the exposure duration not exceeding an exposure-duration threshold, and the motion data exceeding a motion-data threshold, determine a full-range OIS mode as the determined OIS mode.

Aspect 10. The apparatus of aspect 3, wherein the at least one processor is further configured to, based on the EIS margin not exceeding an EIS-margin threshold, the exposure duration not exceeding an exposure-duration threshold, and the motion data not exceeding a motion-data threshold, determine a centered OIS mode as the determined OIS mode.

Aspect 11. The apparatus of any one of aspects 1 to 10, wherein the determined OIS mode is determined from among: a centered OIS mode; a full-range OIS mode; a recentering OIS mode; and a partially-recentering OIS mode.

Aspect 12. The apparatus of any one of aspects 1 to 11, wherein the at least one processor is further configured to adjust a frame-capture rate of the apparatus to allow for recentering duration between capturing of frames.

Aspect 13. The apparatus of any one of aspects 1 to 12, wherein the at least one processor is further configured to adjust a readout duration of the apparatus to allow for recentering duration between capturing of frames.

Aspect 14. The apparatus of any one of aspects 1 to 13, wherein the OIS mode comprises a partially-recentering OIS mode and the at least one processor is further configured to determine a recentering rate based on the image-capture information.

Aspect 15. The apparatus of any one of aspects 1 to 14, wherein the at least one processor is further configured to provide an indication of the determined OIS mode to an electronic-image-stabilization (EIS) engine.

Aspect 16. The apparatus of any one of aspects 1 to 15, wherein the at least one processor is further configured to adjust electronic-image-stabilization (EIS) parameters based on the determined OIS mode.

Aspect 17. The apparatus of any one of aspects 1 to 16, wherein the image-capture information comprises first image-capture information related to a first time instance, wherein the determined OIS mode comprises a first determined OIS mode, and wherein the image comprises a first image, the at least one processor further configured to: obtain second image-capture information related to a second time instance; determine a second OIS mode based on the second image-capture information; and enable the second determined OIS mode while a second image is captured.

Aspect 18. A method for capturing image data, the method comprising: obtaining image-capture information, wherein the image-capture information relates to at least one of image-capture settings of the device, image-processing settings of the device, or image-capture conditions; determining an optical image stabilization (OIS) mode based on the image-capture information; and enabling the determined OIS mode for capturing an image.

Aspect 19. The method of aspect 18, wherein the image-capture information comprises at least one of: motion data indicative of motion of the device; an indication of OIS capabilities of the device; a focal length; a zoom factor; an electronic image stabilization (EIS) margin; an indication of lens distortion; an exposure duration; a readout duration; a frame-capture rate; an indication of a transition between sensors of the device; or an indication of post-processing capabilities of the device.

Aspect 20. The method of any one of aspects 18 or 19, wherein the image-capture information comprises at least one of: an electronic image stabilization (EIS) margin; an exposure duration; or motion data indicative of motion of the device.

Aspect 21. The method of aspect 20, further comprising, based on the EIS margin exceeding an EIS-margin threshold and the exposure duration exceeding an exposure-duration threshold, determining a recentering OIS mode as the determined OIS mode.

Aspect 22. The method of aspect 20, further comprising, based on the EIS margin exceeding an EIS-margin threshold and the exposure duration not exceeding an exposure-duration threshold, determining a centered OIS mode as the determined OIS mode.

Aspect 23. The method of aspect 20, further comprising, based on the EIS margin not exceeding an EIS-margin threshold, the exposure duration exceeding an exposure-duration threshold, and the motion data exceeding a motion-data threshold, determining a full-range OIS mode as the determined OIS mode.

Aspect 24. The method of aspect 20, further comprising, based on the EIS margin not exceeding an EIS-margin threshold, the exposure duration exceeding an exposure-duration threshold, and the motion data not exceeding a motion-data threshold, determining a recentering OIS mode as the determined OIS mode.

Aspect 25. The method of aspect 20, further comprising, based on the EIS margin not exceeding an EIS-margin threshold, and the exposure duration exceeding an exposure-duration threshold, determining a partially-recentering OIS mode as the determined OIS mode; and determining a motion factor for the partially-recentering OIS mode.

Aspect 26. The method of aspect 20, further comprising, based on the EIS margin not exceeding an EIS-margin threshold, the exposure duration not exceeding an exposure-duration threshold, and the motion data exceeding a motion-data threshold, determining a full-range OIS mode as the determined OIS mode.

Aspect 27. The method of aspect 20, further comprising, based on the EIS margin not exceeding an EIS-margin threshold, the exposure duration not exceeding an exposure-duration threshold, and the motion data not exceeding a motion-data threshold, determining a centered OIS mode as the determined OIS mode.

Aspect 28. The method of any one of aspects 18 to 27, wherein the determined OIS mode is determined from among: a centered OIS mode; a full-range OIS mode; a recentering OIS mode; and a partially-recentering OIS mode.

Aspect 29. The method of any one of aspects 18 to 28, further comprising adjusting a frame-capture rate of the device to allow for recentering duration between capturing of frames.

Aspect 30. The method of any one of aspects 18 to 29, further comprising adjusting a readout duration of the device to allow for recentering duration between capturing of frames.

Aspect 31. The method of any one of aspects 18 to 30, wherein the OIS mode comprises a partially-recentering OIS mode and the at least one processor is further configured to determine a recentering rate based on the image-capture information.

Aspect 32. The method of any one of aspects 18 to 31, wherein the at least one processor is further configured to provide an indication of the determined OIS mode to an electronic-image-stabilization (EIS) engine.

Aspect 33. The method of any one of aspects 18 to 32, further comprising adjusting electronic-image-stabilization (EIS) parameters based on the determined OIS mode.

Aspect 34. The method of any one of aspects 18 to 33, wherein the image-capture information comprises first image-capture information related to a first time instance, wherein the determined OIS mode comprises a first determined OIS mode; and wherein the image comprises a first image, the method further comprising: obtaining second image-capture information related to a second time instance; determining a second OIS mode based on the second image-capture information; and enabling the second determined OIS mode while a second image is captured.

Aspect 35. A non-transitory computer-readable medium of a device having stored thereon instructions that, when executed by one or more processors, cause the one or more processors to perform operations according to any one of aspects 18 to 34.

Aspect 36. An apparatus for capturing image data comprising one or more means for performing operations according to any one of aspects 18 to 34.

What is claimed is:

1. An apparatus for capturing image data, the apparatus comprising:

at least one memory; and at least one processor coupled to the at least one memory and configured to:

obtain image-capture information, wherein the image-capture information relates to at least one of image-capture settings of the apparatus, image-processing settings of the apparatus, or image-capture conditions, and wherein the image-capture information includes an electronic image stabilization (EIS) margin;

determine, based on the image-capture information, including the EIS margin, an optical image stabilization (OIS) mode from among a plurality of OIS modes; and enable the determined OIS mode for capturing an image.

2. The apparatus of claim 1, wherein the image-capture information comprises at least one of:

motion data indicative of motion of the apparatus;

an indication of OIS capabilities of the apparatus;

a focal length;

a zoom factor;

an indication of lens distortion;

an exposure duration;

a readout duration;

a frame-capture rate;

an indication of a transition between sensors of the apparatus; or an indication of post-processing capabilities of the apparatus.

3. The apparatus of claim 1, wherein the image-capture information comprises at least one of:

an exposure duration; or motion data indicative of motion of the apparatus.

4. The apparatus of claim 3, wherein the at least one processor is further configured to, based on the EIS margin exceeding an EIS-margin threshold and the exposure duration exceeding an exposure-duration threshold, determine a recentering OIS mode as the determined OIS mode.

5. The apparatus of claim 3, wherein the at least one processor is further configured to, based on the EIS margin exceeding an EIS-margin threshold and the exposure duration not exceeding an exposure-duration threshold, determine a centered OIS mode as the determined OIS mode.

6. The apparatus of claim 3, wherein the at least one processor is further configured to, based on the EIS margin not exceeding an EIS-margin threshold, the exposure duration exceeding an exposure-duration threshold, and the motion data exceeding a motion-data threshold, determine a full-range OIS mode as the determined OIS mode.

7. The apparatus of claim 3, wherein the at least one processor is further configured to, based on the EIS margin not exceeding an EIS-margin threshold, the exposure duration exceeding an exposure-duration threshold, and the motion data not exceeding a motion-data threshold, determine a recentering OIS mode as the determined OIS mode.

8. The apparatus of claim 3, wherein the at least one processor is further configured to, based on the EIS margin not exceeding an EIS-margin threshold, and the exposure duration exceeding an exposure-duration threshold, determine a partially-recentering OIS mode as the determined OIS mode; and determine a motion factor for the partially-recentering OIS mode.

9. The apparatus of claim 3, wherein the at least one processor is further configured to, based on the EIS margin not exceeding an EIS-margin threshold, the exposure duration not exceeding an exposure-duration threshold, and the motion data exceeding a motion-data threshold, determine a full-range OIS mode as the determined OIS mode.

10. The apparatus of claim 3, wherein the at least one processor is further configured to, based on the EIS margin not exceeding an EIS-margin threshold, the exposure duration not exceeding an exposure-duration threshold, and the motion data not exceeding a motion-data threshold, determine a centered OIS mode as the determined OIS mode.

11. The apparatus of claim 1, wherein the plurality of OIS modes comprise:

a centered OIS mode;

a full-range OIS mode;

a recentering OIS mode; and a partially-recentering OIS mode.

12. The apparatus of claim 1, wherein the at least one processor is further configured to adjust a frame-capture rate of the apparatus to allow for recentering duration between capturing of frames.

13. The apparatus of claim 1, wherein the at least one processor is further configured to adjust a readout duration of the apparatus to allow for recentering duration between capturing of frames.

14. The apparatus of claim 1, wherein the determined OIS mode comprises a partially-recentering OIS mode and the at least one processor is further configured to determine a recentering rate based on the image-capture information.

15. The apparatus of claim 1, wherein the at least one processor is further configured to provide an indication of the determined OIS mode to an electronic-image-stabilization (EIS) engine.

16. The apparatus of claim 1, wherein the at least one processor is further configured to adjust EIS parameters based on the determined OIS mode.

17. The apparatus of claim 1, wherein the image-capture information comprises first image-capture information related to a first time instance, wherein the determined OIS mode comprises a first determined OIS mode, and wherein the image comprises a first image, the at least one processor further configured to:

obtain second image-capture information related to a second time instance;

determine a second OIS mode based on the second image-capture information; and enable the second determined OIS mode while a second image is captured.

18. A method for capturing image data, the method comprising:

obtaining image-capture information, wherein the image-capture information relates to at least one of image-capture settings of a device, image-processing settings of the device, or image-capture conditions, and wherein the image-capture information includes an electronic image stabilization (EIS) margin;

determining, based on the image-capture information, including the EIS margin, an optical image stabilization (OIS) mode from among a plurality of OIS modes; and enabling the determined OIS mode for capturing an image.

19. The method of claim 18, wherein the image-capture information comprises at least one of:

motion data indicative of motion of the device;

an indication of OIS capabilities of the device;

a focal length;

a zoom factor;

an indication of lens distortion;

an exposure duration;

a readout duration;

a frame-capture rate;

an indication of a transition between sensors of the device; or an indication of post-processing capabilities of the device.

20. The method of claim 18, wherein the image-capture information comprises at least one of:

an exposure duration; or motion data indicative of motion of the device.

* * * * *